United States Patent
Zhang

(10) Patent No.: US 11,641,580 B2
(45) Date of Patent: May 2, 2023

(54) METHOD AND DEVICE USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/401,331

(22) Filed: Aug. 13, 2021

(65) Prior Publication Data

US 2022/0060886 A1 Feb. 24, 2022

(30) Foreign Application Priority Data

Aug. 18, 2020 (CN) .......................... 202010833256.6

(51) Int. Cl.
| | |
|---|---|
| *H04W 12/03* | (2021.01) |
| *H04L 69/22* | (2022.01) |
| *H04W 12/10* | (2021.01) |
| *H04L 9/40* | (2022.01) |
| *H04W 12/041* | (2021.01) |

(52) U.S. Cl.
CPC .......... *H04W 12/03* (2021.01); *H04L 63/162* (2013.01); *H04L 69/22* (2013.01); *H04W 12/041* (2021.01); *H04W 12/10* (2013.01)

(58) Field of Classification Search
CPC ... H04W 12/03; H04W 12/041; H04W 12/10; H04W 4/40; H04W 12/106; H04L 63/162; H04L 69/22
See application file for complete search history.

(56) References Cited

U.S. PATENT DOCUMENTS

| | | | | |
|---|---|---|---|---|
| 2005/0073974 | A1* | 4/2005 | Kim | H04W 76/11 |
| | | | | 370/349 |
| 2019/0253881 | A1* | 8/2019 | Gage | H04W 12/03 |
| 2019/0261178 | A1* | 8/2019 | Rajadurai | H04W 12/069 |
| 2019/0268818 | A1* | 8/2019 | Yi | H04W 36/0033 |
| 2019/0320416 | A1* | 10/2019 | Han | H04W 80/08 |
| 2020/0092939 | A1* | 3/2020 | Kim | H04W 76/30 |
| 2020/0351877 | A1* | 11/2020 | Wang | H04L 5/0007 |
| 2020/0359450 | A1* | 11/2020 | Xu | H04W 80/08 |

(Continued)

FOREIGN PATENT DOCUMENTS

WO WO-2018120871 A1 * 7/2018 ............ H04L 29/06

*Primary Examiner* — Khalid M Almaghayreh

(57) ABSTRACT

Method and device used for wireless communications, including receiving a second media access control packet data unit (MAC PDU) group, a MAC Header of any MAC PDU in the second MAC PDU group comprising information corresponding to a first portion of a first old identifier (ID); the second MAC PDU group comprising a first packet data convergence protocol (PDCP) PDU, and a header of the first PDCP PDU comprising a first key ID; the first key ID being used to identify a first key, and the first key being used to generate a key for a security algorithm applied to the first PDCP PDU; transmitting a first MAC PDU group comprising a second PDCP PDU, the second PDCP PDU comprising information corresponding to a first portion of the first PDCP PDU; by determining a first key ID and a second key ID, reliability is improved, and risks during communications are avoided.

20 Claims, 5 Drawing Sheets

(56) References Cited

U.S. PATENT DOCUMENTS

| | | | |
|---|---|---|---|
| 2021/0037516 A1* | 2/2021 | Lyu | H04L 1/1854 |
| 2021/0136866 A1* | 5/2021 | Lu | H04L 1/22 |
| 2021/0298070 A1* | 9/2021 | Zhang | H04W 28/0226 |
| 2022/0095161 A1* | 3/2022 | Kim | H04W 12/033 |

* cited by examiner

| $K_{NPR\text{-}sess}$ ID | LSBs of counter | Ciphered payload | Ciphered MAC (if required) |

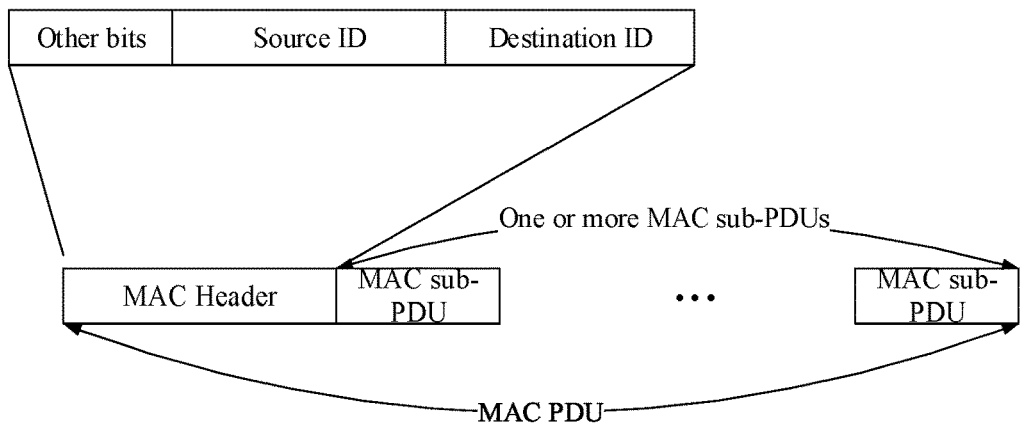
FIG. 8
According to first parameter set —generating→ Third new ID
FIG. 9
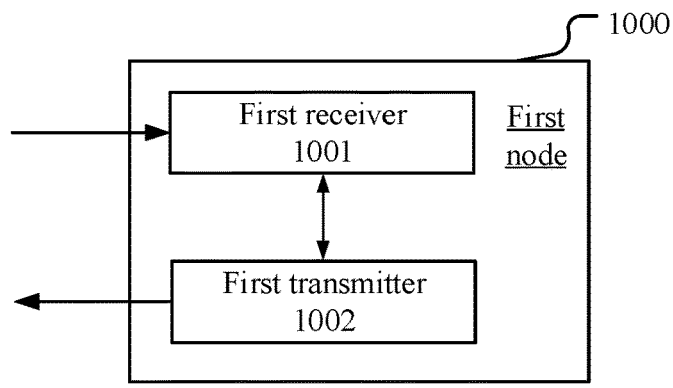
FIG. 10
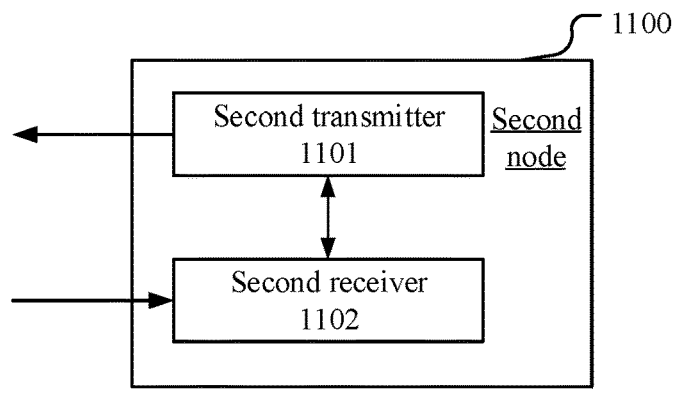
FIG. 11

METHOD AND DEVICE USED FOR WIRELESS COMMUNICATION

CROSS REFERENCE TO RELATED APPLICATIONS

This application claims the priority benefit of Chinese Patent Application No. 202010833256.6, filed on 18 Aug. 2020, the full disclosure of which is incorporated herein by reference.

BACKGROUND

Technical Field

The present disclosure relates to transmission methods and devices in wireless communication systems, and in particular to a method and device of sidelink-related transmission in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum, and lower traffic interruption and call drop rate, higher security and privacy and support to lower consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, radio resource management and multi-antenna codebook selection, primary link communication or sidelink communication as well as signaling design, neighbor management, traffic management and beamforming. Information is generally transmitted by broadcast and unicast, and both ways are beneficial to fulfilling the above requests and make up an integral part of the 5G system.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

SUMMARY

In multiple communication scenarios, such as in UE-UE communications, there will be much concern about reliable link establishment and maintenance, address management configurations, coordination between various layers and the issue of security that may arise therefrom. Since the UE-UE communications, particularly in communications out of the coverage of serving cells, is lacking of management from a central node, the authentication and certification between these two UEs and other aspects of security are more vulnerable to outside threats, for example, a listener may associate a temporary identity with a long-term identity (such as the User ID) in an attempt to grasp the communication situation or geographical position of a user or a certain application, or other private information. Under such circumstances, a feasible solution is to update the UE parameters periodically or at intervals, including the UE ID and parameters relevant to the UE's security algorithm, however, when processing the updated ID and parameters, especially those expressly transmitted, make sure they are updated in a synchronous manner, otherwise, the listener is probable to utilize what has been previously obtained through listening, connecting those identities or parameters not yet updated with both old IDs and parameters and renewed ones, thus making the updating procedure useless. The ID update relates to procedures on a control plane, while data transmission occurs on a user plane, given that they are mutually independent from one another, and the ID update would better not bother the data transmission procedure, when updating identities, it is likely that the receiving direction and the transmitting direction for data transmission are not prepared at the same time. What's worse, these identities and parameters always come from different layers and entities, and some data have contained old parameters, but only new identities and parameters will be required when a transmission starts, thus causing the more complicated privacy issue. When inter-UE communications relate to relay, especially to L2 Relay, new problems with the relay node shown below will have to be addressed: When there isn't a corresponding PDCP entity, how to handle privacy issues in parameter updating procedure? When the link layer identity relayed to a target node is not totally self-controlled by the relay node, how to ensure that the updating of the link layer identity is synchronous with other parameters? When data is not generated autonomously but received by the relay node, how to handle the unsynchronous data reception and signaling? Confronted with such problems in UE-UE communications, particularly relating to sidelink relay communications, traffics concerning security, such as V2X and Proximity Security (Prose) shall be paid more attention. To further enhance privacy and security protection and preventing users from being tracked, a solution is proposed herein in the present disclosure.

It should be noted that if no conflict is incurred, the embodiments of any node in the present disclosure and the characteristics of the embodiments can be applied to any other node, and vice versa. And the embodiments in the present disclosure and the characteristics of the embodiments can be arbitrarily combined if there is no conflict.

The present disclosure provides a method in a first node for wireless communication, comprising:

receiving a second MAC PDU group, with a MAC Header of any MAC PDU in the second MAC PDU group comprising at least part of bits in a first old identifier (ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU;

transmitting a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, a problem to be solved in the present disclosure includes: during inter-UE communications, particularly relating to sidelink relay communications, users will have to update their IDs frequently to ensure security, the update of user ID can happen at any time and is independent from data transmission; the ID update can comprise multiple IDs and multiple parameters, which are required to be updated simultaneously, especially on the transmitting side, if new and old IDs or parameters are mixed in a PDU, and these IDs and parameters are expressly transmitted, it is probable that the listener can associated these IDs and parameters, which may pose great threat to security and privacy. For a relay node, especially a L2 node, since the employment of parameters or IDs on the L3 is not under control, and parameters or IDs on the L2 can be indicated by other node, making it easier for asynchronization of parameter updating and ID updating, including an RLC SDU previously received and not yet forwarded. During the transmission of the data via a MAC layer, the employment of a new ID in transmission or forwarding will result in security risks. With the method offered in the present disclosure, one can make sure that any RLC SDU that uses a new ID for transmission adopts all-new parameters, thus avoiding potential security risks.

In one embodiment, advantages of the above method include that when an RLC layer of the relay node needs to forward data, no security risks will be caused by using a new ID, thus further guaranteeing the user's privacy.

In one embodiment, characteristics of the above method include: MAC refers to Medium Access Control.

In one embodiment, characteristics of the above method include: RLC refers to Radio Link Control.

In one embodiment, characteristics of the above method include: PDCP refers to Packet Data Convergence Protocol.

In one embodiment, characteristics of the above method include: SDU refers to Service Data Unit.

In one embodiment, characteristics of the above method include: PDU refers to Protocol Data Unit.

In one embodiment, characteristics of the above method include: RB refers to Radio Bearer.

In one embodiment, characteristics of the above method include: SRB refers to Signaling Radio Bearer.

In one embodiment, characteristics of the above method include: DRB refers to Data Radio Bearer.

In one embodiment, characteristics of the above method include: SLRB refers to Sidelink Radio Bearer.

In one embodiment, characteristics of the above method include: PC5-S refers to a signaling on PC5 Interface.

In one embodiment, characteristics of the above method include: PC5-RRC refers to an RRC signaling on PC5 Interface.

Specifically, according to one aspect of the present disclosure, receiving a first message, the first message comprising the first new ID; an application of the first new ID is used to trigger a discontinuation of the first old ID;

transmitting a second message as a response to reception of the first message, the second message comprising a second new ID, and an application of the second new ID being used to trigger a discontinuation of a second old ID; the second new ID and the second old ID are link layer IDs, respectively;

receiving a third message, the third message being used to determine the second message; the first message, the second message and the third message are PC5-S messages;

herein, a MAC Header of any MAC PDU in the second MAC PDU group comprises at least part of bits in the second old ID.

Specifically, according to one aspect of the present disclosure, as a response to reception of the third message, and at least for transmission, the first old ID is updated as the first new ID;

receiving any new MAC PDU, the new MAC PDU being any MAC PDU of which the MAC Header comprises at least part of bits in the second new ID and at least part of bits in the first new ID; as a response to reception of any new MAC PDU, and at least for reception, the first old ID is updated as the first new ID.

Specifically, according to one aspect of the present disclosure, transmitting a third MAC PDU group, the third MAC PDU group comprising a first RLC SDU group, the first RLC SDU group comprising a first old PDCP PDU, with a header of the first old PDCP PDU comprising the first key ID and not comprising the second key ID;

the action of transmitting the third MAC PDU group is performed after the reception of the third message, and the first old ID being updated as the first new ID is performed after the action of transmitting the third MAC PDU group.

Specifically, according to one aspect of the present disclosure, receiving fourth information, the fourth information being used to determine the third new ID; when the first old ID is updated as the first new ID, the third new ID is employed; when the first node transmits the second MAC PDU group after employment of the third new ID, a header of any MAC PDU in the second MAC PDU group comprises at least part of bits in the third new ID and not the third old ID.

Specifically, according to one aspect of the present disclosure, the fourth information is a PC5-S message; as a response to reception of the fourth information, transmitting a fifth message, the fifth message comprising a fourth ID;

when the first node transmits the first MAC PDU group after employment of the third new ID, a header of any MAC PDU in the first MAC PDU group comprises at least part of bits in the fourth new ID.

Specifically, according to one aspect of the present disclosure, the fourth information is a higher layer signaling, and the fourth information comprises the third new ID; a transmitter of the fourth information and a transmitter of the first PDCP PDU are the same.

Specifically, according to one aspect of the present disclosure, the fourth information comprises a first parameter set, the first parameter set comprising the first new ID; generating the third new ID according to the first parameter set.

Specifically, according to one aspect of the present disclosure, after the first old ID is updated as the first new ID, the first node configures a field comprising the first key ID in a header of the first PDCP PDU as the second key ID.

Specifically, according to one aspect of the present disclosure, after the first old ID is updated as the first new ID, the first node clears an RLC SDU comprising the first PDCP PDU;

receiving a third PDCP PDU, the third PDCP PDU comprising at least part of bits in the first PDCP PDU, with a header of the third PDCP PDU comprising the second key ID.

Specifically, according to one aspect of the present disclosure, after the first old ID is updated as the first new ID, the first node re-establishes an RLC entity corresponding to an RLC SDU comprising the first PDCP PDU;

receiving a fourth PDCP PDU, the fourth PDCP PDU comprising at least part of bits in the first PDCP PDU; a header of the fourth PDCP PDU comprises the second key ID.

Specifically, according to one aspect of the present disclosure, after the first old ID is updated as the first new ID, when an RB used by the first PDCP PDU is an SRB, the first node clears an RLC SDU comprising the first PDCP PDU, or, the first node re-establishes an RLC entity corresponding to the RLC SDU comprising the first PDCP PDU; when an RB used by the first PDCP PDU is a DRB, the first node configures the first key ID comprised by a header of the first PDCP PDU as the second key ID.

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle-mounted terminal.

Specifically, according to one aspect of the present disclosure, the first node is an aircraft.

The present disclosure provides a method in a second node for wireless communications, comprising:

transmitting a second MAC PDU group, with a MAC Header of any MAC PDU in the second MAC PDU group comprising at least part of bits in a first old identifier (ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU;

a receiver of the second MAC PDU group transmitting a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third ID is different from the first new ID.

Specifically, according to one aspect of the present disclosure, transmitting a first message, the first message comprising the first new ID; an application of the first new ID is used to trigger a discontinuation of the first old ID;

receiving a second message, the second message comprising a second new ID, and an application of the second new ID being used to trigger a discontinuation of a second old ID; the second new ID and the second old ID are link layer IDs, respectively;

transmitting a third message, the third message being used to determine the second message; the first message, the second message and the third message are PC5-S messages;

herein, a MAC Header of any MAC PDU in the second MAC PDU group comprises at least part of bits in the second old ID.

Specifically, according to one aspect of the present disclosure, as a response to reception of the third message by a receiver of the second MAC PDU group, and at least for transmission, the first old ID is updated as the first new ID;

transmitting any new MAC PDU, the new MAC PDU being any MAC PDU of which the MAC Header comprises at least part of bits in the second new ID and at least part of bits in the first new ID; as a response to reception of any new MAC PDU by a receiver of the second MAC PDU group, and at least for reception, the first old ID is updated as the first new ID.

Specifically, according to one aspect of the present disclosure, a receiver of the second MAC PDU group receives fourth information, the fourth information being used to determine the third new ID; when the first old ID is updated as the first new ID, the third new ID is employed; when the second MAC PDU group is transmitted after employment of the third new ID, a header of any MAC PDU in the second MAC PDU group comprises at least part of bits in the third new ID and not the third old ID.

Specifically, according to one aspect of the present disclosure, the fourth information is a higher layer signaling, and the fourth information comprises the third new ID; a transmitter of the fourth information and a transmitter of the first PDCP PDU are the same.

Specifically, according to one aspect of the present disclosure, the fourth information comprises a first parameter set, the first parameter set comprising the first new ID; the first parameter set is used for generating the third new ID.

Specifically, according to one aspect of the present disclosure, after the first old ID is updated as the first new ID, a receiver of the second MAC PDU group configures a field comprising the first key ID in a header of the first PDCP PDU as the second key ID.

Specifically, according to one aspect of the present disclosure, after the first old ID is updated as the first new ID, a receiver of the second MAC PDU group clears an RLC SDU comprising the first PDCP PDU;

transmitting a third PDCP PDU, the third PDCP PDU comprising at least part of bits in the first PDCP PDU, with a header of the third PDCP PDU comprising the second key ID.

Specifically, according to one aspect of the present disclosure, after the first old ID is updated as the first new ID, a receiver of the second MAC PDU group re-establishes an RLC entity corresponding to an RLC SDU comprising the first PDCP PDU;

transmitting a fourth PDCP PDU, the fourth PDCP PDU comprising at least part of bits in the first PDCP PDU; a header of the fourth PDCP PDU comprises the second key ID.

Specifically, according to one aspect of the present disclosure, after the first old ID is updated as the first new ID, when an RB used by the first PDCP PDU is an SRB, a receiver of the second MAC PDU group clears an RLC SDU comprising the first PDCP PDU, or, a receiver of the second MAC PDU group re-establishes an RLC entity corresponding to the RLC SDU comprising the first PDCP PDU; when an RB used by the first PDCP PDU is a DRB, a receiver of the second MAC PDU group configures the first key ID comprised by a header of the first PDCP PDU as the second key ID.

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle-mounted terminal.

Specifically, according to one aspect of the present disclosure, the first node is an aircraft.

The present disclosure provides a first node for wireless communications, comprising:

a first receiver, which receives a second MAC PDU group, with a MAC Header of any MAC PDU in the second MAC PDU group comprising at least part of bits in a first old identifier (ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU;

a first transmitter, which transmits a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

The present disclosure provides a second node for wireless communications, comprising:

a second transmitter, which transmits a second MAC PDU group, with a MAC Header of any MAC PDU in the second MAC PDU group comprising at least part of bits in a first old identifier (ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU;

a receiver of the second MAC PDU group, which transmits a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the present disclosure is advantageous over the prior art in the following aspects:

It is necessary in UE-UE communications to guarantee the user's privacy, avoid the tracking of the user and other potential security risks threatening the updating procedure of the user ID, and the ID update should not impact the experience of the user in receiving traffics; each ID and related parameters are respectively utilized by various layers or entities, if adopting the traditional practice, data which used some pre-update identities or parameters will be transmitted or retransmitted with a new identity, thus leaving some room for the listener to take advantage of such data. The deficiency poses great threat to user security and will be more apparent for a relay node. By further recognizing and processing the data containing old identities or old parameters, the method offered in the present disclosure manages to prevent the risks, particularly, to ensure smooth and seamless data transmission when separating old and new identities and parameters, thereby causing no impact on the user experience. The processing proposed by the present disclosure is more concentrated in the transmitting end of the first node, which has little influence on data reception by remote nodes and seems entirely transparent to the receiver of data, hence high robustness of the system.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of a MAC PDU according to one embodiment of the present disclosure.

FIG. 9 illustrates a schematic diagram of generating a third new ID according to a first parameter set according to one embodiment of the present disclosure.

FIG. 10 illustrates a schematic diagram of a processing device in a first node according to one embodiment of the present disclosure.

FIG. 11 illustrates a schematic diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
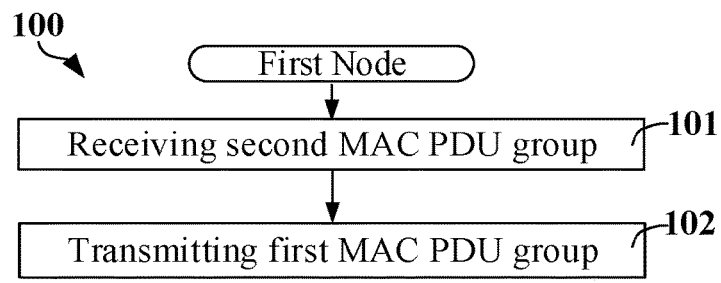
FIG. 1 illustrates a flowchart of receiving a second MAC PDU group and transmitting a first MAC PDU group according to one embodiment of the present disclosure.

Embodiment 1 illustrates a flowchart of receiving a second MAC PDU group and transmitting a first MAC PDU group according to one embodiment of the present disclosure, as shown in FIG. 1. In FIG. 1, each box represents a step. It should be stressed that the sequential order in which each box is arranged does not necessarily imply a chronological order of steps respectively marked by these boxes.

In Embodiment 1, the first node in the present disclosure receives a second MAC PDU group in step 101; and transmits a first MAC PDU group in step 102.

herein, a MAC Header of any MAC PDU in the second MAC PDU group comprises at least part of bits in a first old identifier (ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU; the first MAC PDU group comprises a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the first node is a relay node.

In one embodiment, the first node is a UE.

In one embodiment, the first node receives a first message, the first message comprising the first new ID; an application of the first new ID is used to trigger a discontinuation of the first old ID;

as a response to receiving the first message, the first node transmits a second message, the second message comprising a second new ID, and an application of the second new ID being used to trigger a discontinuation of a second old ID; the second new ID and the second old ID are link layer IDs, respectively;

the first node transmits a third message, the third message being used to determine the second message; the first message, the second message and the third message are PC5-S messages;

herein, a MAC Header of any MAC PDU in the second MAC PDU group comprises at least part of bits in the second old ID.

In one embodiment, the second MAC PDU group comprises Q MAC PDU(s), Q being a positive integer.

In one embodiment, a logical channel occupied by each MAC PDU in the second MAC PDU group includes a Sidelink Control Channel (SCCH).

In one embodiment, a logical channel occupied by each MAC PDU in the second MAC PDU group includes a Sidelink Traffic Channel (STCH).

In one embodiment, a physical channel occupied by each MAC PDU in the second MAC PDU group includes a Physical sidelink shared channel (PSSCH).

In one embodiment, the second MAC PDU group is transmitted through a SideLink Shared CHannel (SL-SCH).

In one embodiment, the second MAC PDU group is transmitted through sidelink.

In one embodiment, the second MAC PDU group comprises all MAC PDUs transmitted with the first old ID.

In one embodiment, the second MAC PDU group comprises all MAC PDUs with MAC Headers comprising the first old ID.

In one embodiment, the second MAC PDU group comprises all MAC PDUs with SRC fields of MAC Headers comprising the first old ID.

In one embodiment, the first MAC PDU group comprises P MAC PDU(s), P being a positive integer.

In one embodiment, a logical channel occupied by each MAC PDU in the first MAC PDU group includes a Sidelink Control Channel (SCCH) or a Sidelink Traffic Channel (STCH).

In one embodiment, a physical channel occupied by each MAC PDU in the first MAC PDU group includes a Physical sidelink shared channel (PSSCH).

In one embodiment, the first MAC PDU group is transmitted through a SL-SCH.

In one embodiment, the first MAC PDU group is transmitted through sidelink.

In one embodiment, the first MAC PDU group comprises all MAC PDUs with MAC Headers comprising the third new ID.

In one embodiment, the MAC layer is a MAC sublayer.

In one embodiment, the RLC layer is an RLC sublayer.

In one embodiment, the PDCP layer is a PDCP sublayer.

In one embodiment, the link layer includes a Link layer.

In one embodiment, the link layer includes a Layer 2.

In one embodiment, the link layer ID includes a Link layer identifier.

In one embodiment, the link layer ID includes a Link layer identity.

In one embodiment, the link layer ID includes a Layer-2 ID.

In one embodiment, the link layer ID includes a Layer 2 ID.

In one embodiment, the link layer ID includes a L2 ID.

In one embodiment, the link layer ID includes a Layer 2 identity.

In one embodiment, the link layer ID includes a Layer 2 identifier.

In one embodiment, the link layer ID comprises 24 bits.

In one embodiment, each MAC PDU in the second MAC PDU group comprises K1 bits in the first old ID, K1 being a positive integer.

In one subembodiment, the K1 bits are K1 most significant bits (MSB) in the first old ID.

In one subembodiment, the K1 bits are K1 least significant bits (LSB) in the first old ID.

In one subembodiment, K1=8.

In one subembodiment, K1=16.

In one subembodiment, K1 is configured by a serving cell of the first node.

In one subembodiment, K1 is configured by the first node autonomously.

In one subembodiment, K1 is stationarily configured by hardcore of the first node.

In one subembodiment, K1 is configured by a transmitter of the first message.

In one subembodiment, the first node receives second Sidelink Control Information (SCI), and the second SCI comprises bits other than the K1 bits in the first old ID.

In one embodiment, each MAC PDU in the second MAC PDU group comprises K2 bits in a second old ID, K2 being a positive integer.

In one subembodiment, the K2 bits are K2 most significant bits (MSB) in the second old ID.

In one subembodiment, the K2 bits are K2 least significant bits (LSB) in the second old ID.

In one subembodiment, K2=8.

In one subembodiment, K2=16.

In one subembodiment, K2 is configured by a serving cell of the first node.

In one subembodiment, K2 is configured by the first node autonomously.

In one subembodiment, K2 is stationarily configured by hardcore of the first node.

In one subembodiment, K2 is configured by a transmitter of the first message.

In one subembodiment, the first node receives second Sidelink Control Information (SCI), the second SCI comprising bits other than the K2 bits in the second old ID.

In one embodiment, upon being updated as the first new ID, the first old ID is no longer used.

In one embodiment, upon being updated as the first new ID, a header of a MAC PDU transmitted by the first node comprises the first new ID rather than the first old ID.

In one embodiment, upon being updated as the first new ID, a header of a MAC PDU transmitted by the first node, if comprising the first new ID, will definitely not comprise the first old ID.

In one embodiment, upon being updated as the first new ID, the first old ID will be discontinued within a period.

In one embodiment, as soon as the first new ID is used for data transmission, the first old ID will be discontinued for data transmission.

In one embodiment, as soon as the first new ID is used for data reception, the first old ID will be discontinued for data reception.

In one embodiment, using the first new ID to transmit data includes configuring a DST field in a header of a transmitted MAC PDU to be part of bits in the first new ID.

In one embodiment, using the new ID to receive data includes receiving a MAC PDU with a header in which the SRC field is part of bits in the first new ID.

In one embodiment, as soon as the first old ID is discontinued, the first new ID will be employed.

In one embodiment, the phrase "when the first old ID is updated as a first new ID" includes that at least for transmission or reception, the first old ID is updated as a first new ID.

In one subembodiment, the phrase that for transmission, the first old ID is updated as a first new ID includes a meaning that a MAC Header of any MAC PDU transmitted comprises at least part of bits in the first new ID.

In one subembodiment, the phrase that for reception, the first old ID is updated as a first new ID includes a meaning that the first new ID is used to receive a MAC PDU.

In one subembodiment, the phrase that for reception, the first old ID is updated as a first new ID includes a meaning that when a link layer ID jointly determined by received SCI and a header of a MAC PDU associated with the SCI comprises the first new ID, the MAC PDU received is submitted to a higher layer for processing.

In one subembodiment, the phrase that for reception, the first old ID is updated as a first new ID includes a meaning that when a link layer ID jointly determined by received SCI and a header of a MAC PDU associated with the SCI comprises the first old ID, the MAC PDU received is discarded.

In one subembodiment, the phrase that for reception, the first old ID is updated as a first new ID includes a meaning that a MAC PDU comprising the first old ID is no longer processed or received.

In one subembodiment, the phrase that for reception, the first old ID is updated as a first new ID includes a meaning that a MAC PDU transmitted with the first old ID is no longer processed or received.

In one subembodiment, the phrase that for reception, the first old ID is updated as a first new ID includes a meaning that the first old ID no longer belongs to a link layer ID list maintained by the first node.

In one subembodiment, the first old ID being updated as a first new ID for transmission and the first old ID being updated as a first new ID for reception do not occur at the same time.

In one subembodiment, the first old ID being updated as a first new ID for transmission is earlier than the first old ID being updated as a first new ID for reception.

In one embodiment, the second key ID comprises $K_{NRP-sess}$ ID.

In one embodiment, the second key ID is $K_{NRP-sess}$ ID.

In one embodiment, the second key ID is an identity of $K_{NRP-sess}$.

In one embodiment, the second key ID comprises an identity of $K_{NRP}$.

In one embodiment, the first key ID comprises $K_{NRP-sess}$ ID.

In one embodiment, the first key ID is $K_{NRP-sess}$ ID.

In one embodiment, the first key ID is an identity of $K_{NRP-sess}$.

In one embodiment, the first key ID comprises an identity of $K_{NRP}$.

In one embodiment, the first key comprises KNRP-sess.

In one embodiment, the first key comprises KNRP.

In one embodiment, the phrase that "the first key is used for generating a key used for a security algorithm applied to the first PDCP PDU" includes a meaning that the first key is used for generating a key used for a security algorithm applied to each PDCP PDU in the first PDCP PDU.

In one embodiment, the phrase that "the first key is used for generating a key used for a security algorithm applied to the first PDCP PDU" includes a meaning that the security algorithm applied to the first PDCP PDU comprises encryption.

In one embodiment, the phrase that "the first key is used for generating a key used for a security algorithm applied to the first PDCP PDU" includes a meaning that the security algorithm applied to the first PDCP PDU comprises Integrity protection.

In one embodiment, the phrase that "the first key is used for generating a key used for a security algorithm applied to the first PDCP PDU" includes a meaning that the security algorithm applied to the first PDCP PDU is used for a payload comprised by any PDCP PDU in the first PDCP PDU.

In one embodiment, the phrase that "the first key is used for generating a key used for a security algorithm applied to the first PDCP PDU" includes a meaning that the security algorithm applied to the first PDCP PDU is used for a Message Authentication Code for Integrity (MAC-I) comprised by any PDCP PDU in the first PDCP PDU.

In one embodiment, the phrase that "the first key is used for generating a key used for a security algorithm applied to the first PDCP PDU" includes a meaning that the security algorithm applied to the first PDCP PDU comprises encryption, a key used in the encryption comprises NRPEK and the first key is used for generating the NRPEK.

In one subembodiment, the first node generates the NRPEK by the first key according to internal algorithm.

In one subembodiment, the first node generates the NRPEK by the first key according to standard algorithm.

In one subembodiment, the first node randomly selects some bits from the first key to generate the NRPEK.

In one embodiment, the phrase that "the first key is used for generating a key used for a security algorithm applied to the first PDCP PDU" includes a meaning that the security algorithm applied to the first PDCP PDU comprises integrity protection, a key used in the integrity protection comprises NRPIK and the first key is used for generating the NRPIK.

In one subembodiment, the first node generates the NRPIK by the first key according to internal algorithm.

In one subembodiment, the first node generates the NRPIK by the first key according to standard algorithm.

In one subembodiment, the first node randomly selects some bits from the first key to generate the NRPIK.

In one embodiment, the first key ID is used for uniquely determining the first key.

In one embodiment, the first key ID is mapped to the first key.

In one embodiment, the second key ID is used for uniquely determining the first key.

In one embodiment, the second key ID is mapped to the first key.

In one embodiment, a header of any PDCP PDU carried by the second MAC PDU group comprises the first key ID.

In one embodiment, a header of any PDCP PDU carried by at least one MAC PDU in the second MAC PDU group comprises the first key ID.

In one embodiment, the first PDCP PDU is carried as a payload by an RLC PDU, and the RLC PDU is carried as a payload by a MAC PDU in the second MAC PDU group.

In one embodiment, a header of any PDCP PDU carried by the first MAC PDU group comprises the second key ID.

In one embodiment, a header of any PDCP PDU carried by at least one MAC PDU in the first MAC PDU group comprises the second key ID.

In one embodiment, the second PDCP PDU is carried as a payload by an RLC PDU, and the RLC PDU carrying the second PDCP PDU is carried as a payload by a MAC PDU in the first MAC PDU group.

In one embodiment, the first MAC PDU group is used for forwarding data carried by the second MAC PDU group.

In one embodiment, whether a header of a PDCP PDU carried by the first MAC PDU group comprises the first key ID or the second key ID depends on whether the first old ID is updated as the first new ID.

In one embodiment, when the first old ID is not updated as the first new ID, a head of any MAC PDU in the first MAC PDU group transmitted by the first node comprises at least part of bits in the third old ID and not the third new ID.

In one subembodiment, a head of any MAC PDU in the first MAC PDU group does not comprise the first old ID.

In one subembodiment, a head of any MAC PDU in the first MAC PDU group does not comprise the second old ID.

In one subembodiment, a head of any MAC PDU in the first MAC PDU group does not comprise the first new ID.

In one subembodiment, a head of any MAC PDU in the first MAC PDU group does not comprise the second new ID.

In one subembodiment, when the first MAC PDU group is transmitted, the first old ID is not updated as the first new ID.

In one embodiment, when the first old ID is updated as the first new ID, a head of any MAC PDU in the first MAC PDU group transmitted by the first node comprises at least part of bits in the third new ID and not the third old ID.

In one subembodiment, a head of any MAC PDU in the first MAC PDU group does not comprise the first old ID.

In one subembodiment, a head of any MAC PDU in the first MAC PDU group does not comprise the second old ID.

In one subembodiment, a head of any MAC PDU in the first MAC PDU group does not comprise the first new ID.

In one subembodiment, a head of any MAC PDU in the first MAC PDU group does not comprise the second new ID.

In one subembodiment, when the first MAC PDU group is transmitted, the first old ID is updated as the first new ID.

In one embodiment, data received with a first old ID is forwarded with a third old ID; data received with a first new ID is forwarded with a third new ID.

In one embodiment, a transmitter of the first PDCP PDU is a source UE, and a receiver of the second PDCP PDU is a target UE.

In one embodiment, each MAC PDU in the first MAC PDU group comprises K1 bits in either the third old ID or the third new ID, K1 being a positive integer.

In one subembodiment, the K1 bits are K1 most significant bits (MSB) in the third old ID or the third new ID.

In one subembodiment, the K1 bits are K1 least significant bits (LSB) in the third old ID or the third new ID.

In one subembodiment, K1=8.

In one subembodiment, K1=16.

In one subembodiment, K1 is configured by a serving cell of the first node.

In one subembodiment, K1 is configured by the first node autonomously.

In one subembodiment, K1 is stationarily configured by hardcore of the first node.

In one subembodiment, K1 is configured by a transmitter of the first message.

In one subembodiment, the first node receives second Sidelink Control Information (SCI), and the second SCI comprises bits other than the K1 bits in the third old ID or in the third new ID.

In one embodiment, each MAC PDU in the first MAC PDU group comprises K2 bits in a fourth old ID or a fourth new ID, K2 being a positive integer.

In one subembodiment, the K2 bits are K2 most significant bits (MSB) in the fourth old ID or the fourth new ID.

In one subembodiment, the K2 bits are K2 least significant bits (LSB) in the fourth old ID or the fourth new ID.

In one subembodiment, K2=8.

In one subembodiment, K2=16.

In one subembodiment, K2 is configured by a serving cell of the first node.

In one subembodiment, K2 is configured by the first node autonomously.

In one subembodiment, K2 is stationarily configured by hardcore of the first node.

In one subembodiment, K2 is configured by a transmitter of the first message.

In one subembodiment, the first node receives second Sidelink Control Information (SCI), the second SCI comprising bits other than the K2 bits in the fourth old ID or in the fourth new ID.

In one embodiment, nodes determined or identified by the third new ID and the first new ID are different.

In one embodiment, the second PDCP PDU comprises at least part of bits in a payload of the first PDCP PDU.

In one embodiment, the payload of the second PDCP PDU is the same as the payload of the first PDCP PDU.

In one embodiment, the second PDCP PDU and the first PDCP PDU comprise a same PDCP SDU.

In one embodiment, the second PDCP PDU and the first PDCP PDU comprise the same bits except for a field in the first key ID or a field in the second key ID.

In one embodiment, an RLC entity corresponding to an RLC SDU carried by the first MAC PDU group is in an AM mode.

In one embodiment, an RB employed by an RLC SDU carried by the first MAC PDU group comprises an AM DRB.

In one embodiment, an RB employed by an RLC SDU carried by the first MAC PDU group comprises an AM SRB.

Embodiment 2

Figure 2:
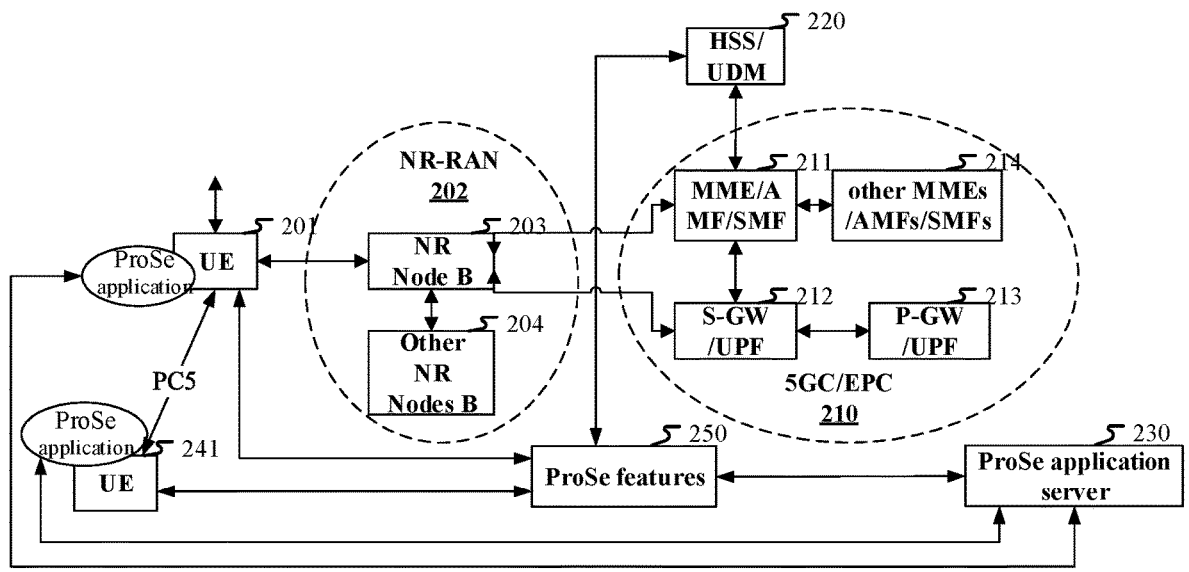
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted communication units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool. In the 5G core network, functions similar to those provided by the ProSe feature 250 can be realized by Policy Control Function (PCF), or be realized independently or combined with a V2X Application Server. In 5GC, the ProSe feature 250 can be realized by PCF. In 5GS, the ProSe application server 230 can be realized within AF of 5GC.

In one embodiment, the UE 201 and the UE 241 are connected by a PC5 Reference Point.

In one embodiment, the ProSe feature 250 is connected to the UE 201 and the UE 241 respectively via PC3 Reference Points.

In one embodiment, the ProSe feature 250 is connected to the ProSe application server 230 via a PC2 Reference Point.

In one embodiment, the ProSe application server 230 is connected to the ProSe application of the UE 201 and the ProSe application of the UE 241 respectively via PC1 Reference Points.

In one embodiment, the first node and the second node in the present disclosure are the UE 201 and the UE 241, respectively.

In one embodiment, a radio link between the UE 201 and the UE 241 corresponds to the Sidelink (SL) in the present disclosure.

In one embodiment, a radio link from the UE 201 to the NR Node B is an uplink.

In one embodiment, a radio link from the NR Node B to the UE 201 is a downlink.

In one embodiment, a radio link from the UE 241 to the NR Node B is an uplink.

In one embodiment, a radio link from the NR Node B to the UE 241 is a downlink.

In one embodiment, the UE 201 supports relayed transmission.

In one embodiment, the UE 241 supports relayed transmission.

In one embodiment, the gNB203 is a MarcoCellular base station.

In one embodiment, the gNB203 is a MicroCell base station.

In one embodiment, the gNB203 is a PicoCell base station.

In one embodiment, the gNB203 is a flight platform.

In one embodiment, the gNB203 is satellite equipment.

Embodiment 3

Figure 3:
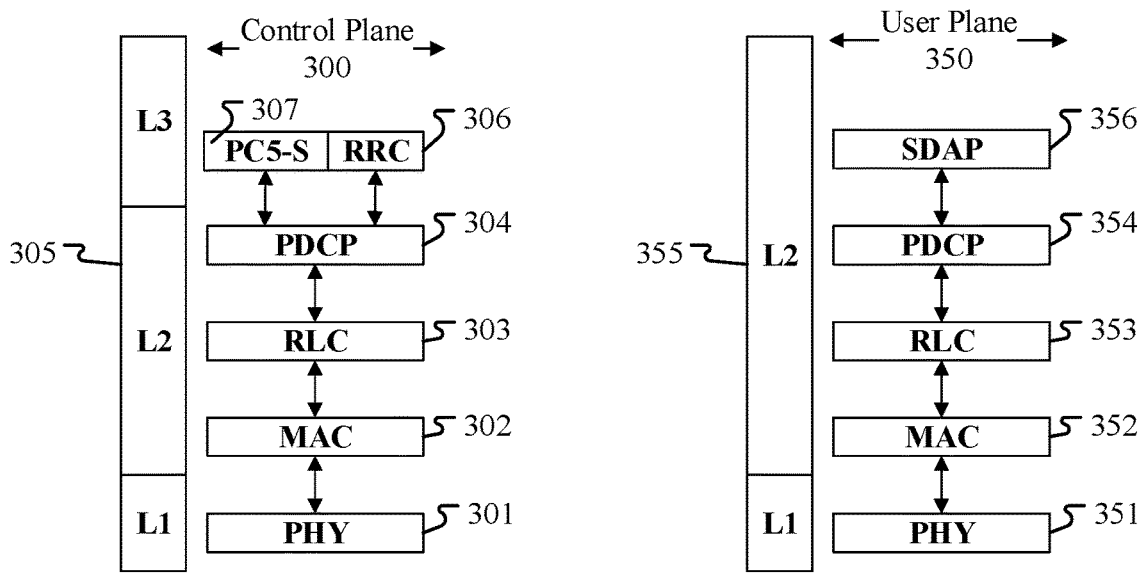
FIG. 3 illustrates a schematic diagram of a radio protocol architecture of a user plane and a control plane according to one embodiment of the present disclosure.

Embodiment 3 illustrates a schematic diagram of one embodiment of a radio protocol architecture of a user plane and a control plane according to the present disclosure, as shown in FIG. 3. FIG. 3 is a schematic diagram illustrating an example of a radio protocol architecture of a user plane 350 and a control plane 300. In FIG. 3, the radio protocol architecture for a control plane 300 between a first node (UE, gNB, or, satellite or aircraft in NTN) and a second node (gNB, UE, or, satellite or aircraft in NTN), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides data encryption and integrity protection, and also provides support for handover of a second node between first nodes. The RLC sublayer 303 provides segmentation and reassembling of a packet, retransmission of a lost packet through ARQ, and detection of duplicate packets and protocol errors. The MAC sublayer 302 provides mapping between a logical channel and a transport channel as well as multiplexing between logical channels. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS flows and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first MAC PDU group in the present disclosure is generated by the MAC 302 or the MAC 352.

In one embodiment, the second MAC PDU group in the present disclosure is generated by the MAC 302 or the MAC 352.

In one embodiment, the third MAC PDU group in the present disclosure is generated by the MAC 302 or the MAC 352.

In one embodiment, the any new MAC PDU group in the present disclosure is generated by the MAC 302 or the MAC 352.

In one embodiment, the first message in the present disclosure is generated by the PC5-S307.

In one embodiment, the second message in the present disclosure is generated by the PC5-S307.

In one embodiment, the third message in the present disclosure is generated by the PC5-S307.

In one embodiment, the fifth message in the present disclosure is generated by the PC5-S307.

In one embodiment, the first RLC SDU group in the present disclosure is generated by the RLC303 or the RLC353.

In one embodiment, the first RLC SDU group in the present disclosure is generated by the RLC303 or the RLC353.

In one embodiment, the first PDCP PDU in the present disclosure is generated by the PDCP304 or the PDCP354.

In one embodiment, the second PDCP PDU in the present disclosure is generated by the PDCP304 or the PDCP354.

In one embodiment, the third PDCP PDU in the present disclosure is generated by the PDCP304 or the PDCP354.

In one embodiment, the fourth PDCP PDU in the present disclosure is generated by the PDCP304 or the PDCP354.

In one embodiment, the first old PDCP PDU in the present disclosure is generated by the PDCP304 or the PDCP354.

In one embodiment, the fourth information in the present disclosure is generated by the PC5-S307, or the RRC306, or the MAC302 or the MAC352, or the RLC303 or the RLC353, or the PDCP304 or the PDCP354.

Embodiment 4

Figure 4:
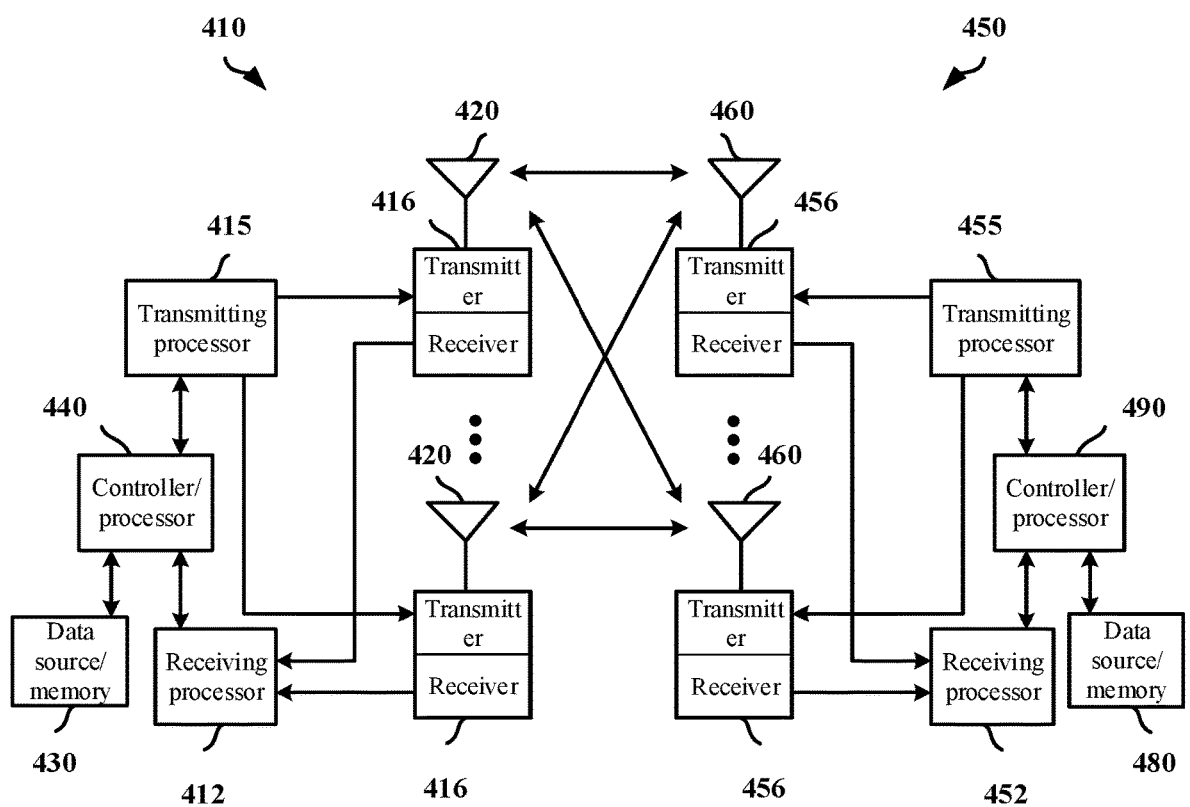
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a second MAC PDU group, with a MAC Header of any MAC PDU in the second MAC PDU group comprising at least part of bits in a first old identifier (ID); the second MAC PDU group comprising a first PDCP PDU, and a header of the first PDCP PDU comprising a first key ID; the first key ID being used to identify a first key, and the first key being used for generating a key used for a security algorithm applied to the first PDCP PDU; transmits a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID; herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the first communication device 450 comprises a memory that stores a computer readable instruction program. The computer readable instruction program generates actions when executed by at least one processor. The actions include: receiving a second MAC PDU group, with a MAC Header of any MAC PDU in the second MAC PDU group comprising at least part of bits in a first old identifier (ID); the second MAC PDU group comprising a first PDCP PDU, and a header of the first PDCP PDU comprising a first key ID; the first key ID being used to identify a first key, and the first key being used for generating a key used for a security algorithm applied to the first PDCP PDU; transmitting a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID; herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a second MAC PDU group, with a MAC Header of any MAC PDU in the second MAC PDU group comprising at least part of bits in a first old identifier (ID); the second MAC PDU group comprising a first PDCP PDU, and a header of the first PDCP PDU comprising a first key ID; the first key ID being used to identify a first key, and the first key being used for generating a key used for a security algorithm applied to the first PDCP PDU; a receiver of the second MAC PDU group, which transmits a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID; herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the second communication device 410 comprises a memory that stores a computer readable instruction program. The computer readable instruction program generates actions when executed by at least one processor. The actions include: transmitting a second MAC PDU group, with a MAC Header of any MAC PDU in the second MAC PDU group comprising at least part of bits in a first old identifier (ID); the second MAC PDU group comprising a first PDCP PDU, and a header of the first PDCP PDU comprising a first key ID; the first key ID being used to identify a first key, and the first key being used for generating a key used for a security algorithm applied to the first PDCP PDU; a receiver of the second MAC PDU group transmitting a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID; herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a vehicle-mounted terminal.

In one embodiment, the second communication device 410 is a UE.

In one embodiment, the second communication device 410 is a vehicle-mounted terminal.

In one embodiment, the receiver 456 (comprising the antenna 460), the receiving processor 452 and the controller/processor 490 are used for receiving the second MAC PDU group in the present disclosure.

In one embodiment, the receiver 456 (comprising the antenna 460), the receiving processor 452 and the controller/processor 490 are used for receiving the third PDCP PDU in the present disclosure.

In one embodiment, the receiver 456 (comprising the antenna 460), the receiving processor 452 and the controller/processor 490 are used for receiving the fourth PDCP PDU in the present disclosure.

In one embodiment, the receiver 456 (comprising the antenna 460), the receiving processor 452 and the controller/processor 490 are used for receiving the first old PDCP PDU in the present disclosure.

In one embodiment, the receiver 456 (comprising the antenna 460), the receiving processor 452 and the controller/processor 490 are used for receiving any new MAC PDU in the present disclosure.

In one embodiment, the receiver 456 (comprising the antenna 460), the receiving processor 452 and the controller/processor 490 are used for receiving the first message in the present disclosure.

In one embodiment, the receiver 456 (comprising the antenna 460), the receiving processor 452 and the controller/processor 490 are used for receiving the fourth information in the present disclosure.

In one embodiment, the receiver 456 (comprising the antenna 460), the receiving processor 452 and the controller/processor 490 are used for receiving the third message in the present disclosure.

In one embodiment, the transmitter 456 (comprising the antenna 460), the transmitting processor 455 and the controller/processor 490 are used for transmitting the first MAC PDU group in the present disclosure.

In one embodiment, the transmitter 456 (comprising the antenna 460), the transmitting processor 455 and the controller/processor 490 are used for transmitting the third MAC PDU group in the present disclosure.

In one embodiment, the transmitter 456 (comprising the antenna 460), the transmitting processor 455 and the controller/processor 490 are used for transmitting the second message in the present disclosure.

In one embodiment, the transmitter 456 (comprising the antenna 460), the transmitting processor 455 and the controller/processor 490 are used for transmitting the fifth message in the present disclosure.

In one embodiment, the receiver 416 (comprising the antenna 420), the receiving processor 412 and the controller/processor 440 are used for receiving the second message in the present disclosure.

In one embodiment, the transmitter 416 (comprising the antenna 420), the transmitting processor 412 and the controller/processor 440 are used for transmitting the second MAC PDU group in the present disclosure.

In one embodiment, the transmitter 416 (comprising the antenna 420), the transmitting processor 412 and the controller/processor 440 are used for transmitting the first message in the present disclosure.

In one embodiment, the transmitter 416 (comprising the antenna 420), the transmitting processor 412 and the controller/processor 440 are used for transmitting the third message in the present disclosure.

In one embodiment, the transmitter 416 (comprising the antenna 420), the transmitting processor 412 and the controller/processor 440 are used for transmitting the third PDCP PDU in the present disclosure.

In one embodiment, the transmitter 416 (comprising the antenna 420), the transmitting processor 412 and the controller/processor 440 are used for transmitting the fourth PDCP PDU in the present disclosure.

In one embodiment, the transmitter 416 (comprising the antenna 420), the transmitting processor 412 and the controller/processor 440 are used for transmitting the first old PDCP PDU in the present disclosure.

In one embodiment, the transmitter 416 (comprising the antenna 420), the transmitting processor 412 and the controller/processor 440 are used for transmitting the any new MAC PDU in the present disclosure.

In one embodiment, the transmitter 416 (comprising the antenna 420), the transmitting processor 412 and the controller/processor 440 are used for transmitting the fourth information in the present disclosure.

Embodiment 5

Figure 5:
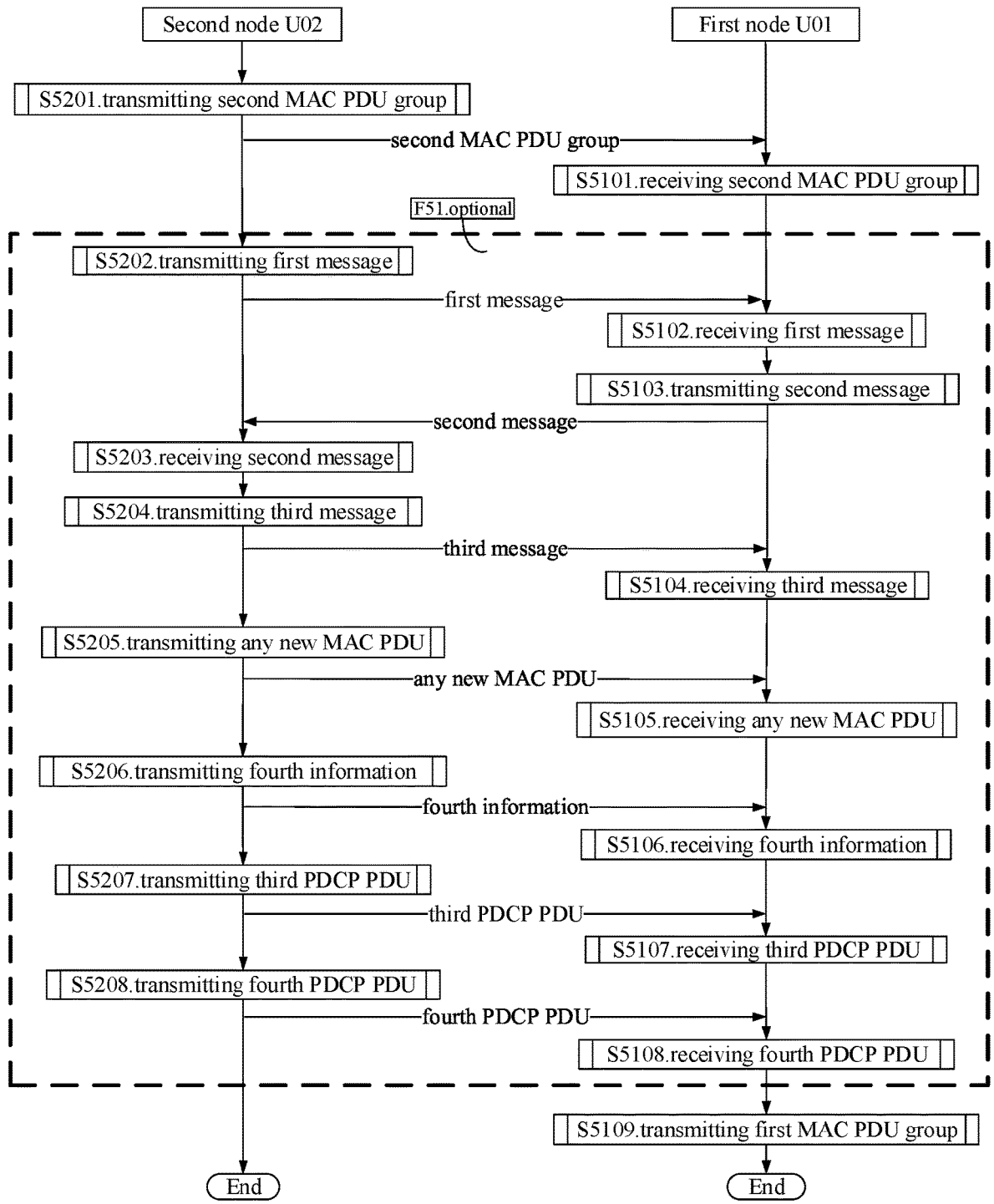
FIG. 5 illustrates a flowchart of a radio signal transmission according to one embodiment of the present disclosure.

Embodiment 5 illustrates a flowchart of a radio signal transmission according to one embodiment of the present disclosure, as shown in FIG. 5. In FIG. 5, a U01 corresponds to a first node in the present disclosure, while a U02 corresponds to a second node in the present disclosure. It should be particularly noted that the sequential order illustrated herein does not necessarily imply an order of signal transmissions and implementations, herein, steps marked by the box F51 are optional.

The first node U01 receives a second MAC PDU group in step S5101; receives a first message in step S5102; transmits a second message in step S5103; and receives a third message in step S5104; receives any new MAC PDU in step S5105; and receives fourth information in step S5106; receives a third PDCP PDU in step S5107; receives a fourth PDCP PDU in step S5108; and transmits a first MAC PDU group in step S5109.

The second node U02 transmits the second MAC PDU group in step S5201; and transmits the first message in step S5202; receives the second message in step S5203; transmits the third message in step S5204; and transmits any new MAC PDU in step S5205; transmits the fourth information in step S5206; transmits the third PDCP PDU in step S5207; and transmits the fourth PDCP PDU in step S5208.

In Embodiment 5, a MAC Header of any MAC PDU in the second MAC PDU group comprising at least part of bits in a first old ID; the second MAC PDU group comprising a first PDCP PDU, and a header of the first PDCP PDU comprising a first key ID; the first key ID being used to identify a first key, and the first key being used for generating a key used for a security algorithm applied to the first PDCP PDU; the first MAC PDU group comprises a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID; the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, an interface for communications between the first node U01 and the second node U02 is a PC5 interface.

In one embodiment, an interface for communications between the first node U01 and the second node U02 is a Uu interface.

In one embodiment, the first node U01 is a UE, and the second node U02 is a UE, too.

In one embodiment, the first node U01 is a UE, and the second node U02 is a relay.

In one embodiment, the first node U01 is a relay, and the second node U02 is a UE.

In one embodiment, the second node U02 is a source node, and the first node U01 is a relay.

In one embodiment, the third new ID is used for identifying a node other than a transmitter of the second MAC PDU group.

In one embodiment, the third new ID is used for identifying a node other than a transmitter of the second MAC PDU group and the first node.

In one embodiment, a target node of a MAC PDU transmitted from the first node with a MAC Header comprising at least part of bits in the third new ID is a node other than a transmitter of the second MAC PDU group.

In one embodiment, a node indicated by a DST field of a MAC Header of a MAC PDU transmitted from the first node with a MAC Header comprising at least part of bits in the third new ID is a node other than a transmitter of the second MAC PDU group.

In one embodiment, the third new ID is used for identifying the first node.

In one embodiment, when a header of a MAC PDU in the first MAC PDU group comprises at least part of bits in the third new ID, the third new ID is used for identifying the first node.

In one embodiment, when a header of a MAC PDU in the first MAC PDU group comprises at least part of bits in the third new ID, the third new ID is a link layer Indicator of the first node.

In one embodiment, the first node U01 receives a first physical layer signaling, the first physical layer signaling comprising configuration information of a first channel, and the second MAC PDU group is transmitted on the first channel; the first physical layer signaling and any MAC PDU in the second MAC PDU group jointly comprise the first old ID; the first physical layer signaling and any MAC PDU in the second MAC PDU group jointly comprise the second old ID.

In one subembodiment, the first physical layer signaling comprises Downlink Control Information (DCI).

In one subembodiment, the first physical layer signaling comprises Sidelink Control Information (SCI).

In one subembodiment, a physical layer channel occupied by the first physical layer signaling includes a PSCCH.

In one subembodiment, a physical layer channel occupied by the first physical layer signaling includes a PDCCH.

In one subembodiment, the first physical layer signaling comprises time-frequency resource information occupied by a MAC PDU in the second MAC PDU group.

In one subembodiment, the first physical layer signaling comprises scheduling information of a MAC PDU in the second MAC PDU group.

In one subembodiment, the first channel includes a PDSCH.

In one subembodiment, the first channel includes a PSSCH.

In one subembodiment, the configuration information of the first channel comprises time-frequency resource information.

In one subembodiment, the configuration information of the first channel comprises RV information.

In one subembodiment, the configuration information of the first channel comprises NDI information.

In one subembodiment, the configuration information of the first channel comprises HARQ information.

In one subembodiment, the first physical layer signaling comprises N1 least significant bit(s) (LSB) in the first old ID, and any MAC PDU in the first MAC PDU group comprises bits other than the N1 LSB in the first old ID, where N1 is an integer greater than 0.

In one subembodiment, the first physical layer signaling comprises N2 most significant bit(s) (MSB) in the second old ID, and any MAC PDU in the first MAC PDU group comprises bits other than the N2 MSB in the second old ID, where N2 is an integer greater than 0.

In one embodiment, the first message is DIRECT LINK IDENTIFIER UPDATE REQUEST.

In one embodiment, the second message is DIRECT LINK IDENTIFIER UPDATE ACCEPT.

In one embodiment, the third message is DIRECT LINK IDENTIFIER UPDATE ACK.

In one embodiment, the second message is used for accepting a request of the first message.

In one embodiment, the first message indicates a new application layer ID and a new IP address.

In one embodiment, the first message indicates KN1 most significant bit(s) (MSB) in the second key ID.

In one embodiment, the first key ID is used for encrypting a PDCP PDU comprised by the second MAC PDU group received by the first node U01.

In one embodiment, the first message is transmitted as a payload of a PDCP PDU carried by the second MAC PDU group.

In one embodiment, the second message comprises KN2 least significant bit(s) (LSB) and KN1 most significant bit(s) (MSB) in the second key ID, the second key ID comprising (KN1+KN2) bits.

In one embodiment, the second message comprises the first new ID and the second new ID.

In one embodiment, the second message comprises a first application layer ID and a second application layer ID, wherein the first message comprises the first application layer ID; the first application layer ID and the second application layer ID are application layer IDs, respectively.

In one subembodiment, the first application layer ID identifies the second node U02.

In one subembodiment, the first application layer ID identifies the application of the second node U02.

In one subembodiment, the second application layer ID identifies the first node U01.

In one subembodiment, the second application layer ID identifies the application of the first node U01.

In one embodiment, the second message comprises a first IP address and a second IP address; herein the first message comprises the first IP address; the first IP address is used for transmission of higher-layer data carried by the second MAC PDU group.

In one subembodiment, the higher-layer data comprises IP layer data.

In one embodiment, the third message is used for acknowledging the second message.

In one embodiment, the third message comprises KN2 LSB in the second key ID.

In one embodiment, the third message comprises the second new ID.

In one embodiment, the third message comprises the second application layer ID.

In one embodiment, the third message comprises the second IP address.

In one embodiment, a higher layer of the second node U02 triggers transmission of the first message.

In one embodiment, expiration of a first privacy timer of the second node U02 triggers transmission of the first message.

In one embodiment, when the first message is transmitted, the second node U02 starts a first timer, when the first timer is expired and the second message is not received, the second node U02 retransmits the first message.

In one subembodiment, when the first message is received, the second node U02 stops the first timer.

In one subembodiment, the first timer is T5009.

In one subembodiment, when the first message is retransmitted, the first timer is restarted.

In one embodiment, when the second message is transmitted, the first node U01 starts a second timer, when the second timer is expired and the third message is not received, the first node U01 retransmits the second message.

In one subembodiment, when the third message is received, the first node U01 stops the second timer.

In one subembodiment, the second timer is T5010.

In one subembodiment, when the second message is retransmitted, the second timer is restarted.

In one subembodiment, a MAC PDU carrying a retransmission of the second message comprises at least part of bits in the first old ID and at least part of bits in the second old ID.

In one embodiment, when the second message is transmitted, the first node U01 starts a second timer, when the second timer is expired, the third message is not received and a maximum number of retransmissions of the second message has been reached, the first node U01 transmits a 1a message; the 1a message comprises a 3a new ID, the application of the 3a new ID is used for triggering discontinuation of the second old ID; the 1a message comprises at least part of bits in a third key ID.

In one embodiment, the 1a message is DIRECT LINK IDENTIFIER UPDATE REQUEST.

In one embodiment, the 1a message is DIRECT LINK ESTABLISHMENT REQUEST.

In one embodiment, the 1a message is DIRECT LINK REKEYING REQUEST.

In one subembodiment, the application of the 3a new ID is used for triggering discontinuation of the first old ID.

In one subembodiment, the 3a new ID is the second new ID.

In one subembodiment, the 3a new ID is the second key ID.

In one subembodiment, the application of the 3a new ID triggers the application of the third key ID.

In one subembodiment, a header of a MAC PDU carrying the 1a message comprises at least part of bits in the first old ID and at least part of bits in the second old ID.

In one embodiment, the first key ID comprised by a PDCP PDU header identifies or is used for determining the security context of the PDCP PDU.

In one embodiment, a header of a MAC PDU carrying the third message comprises at least part of bits in the first old ID and at least part of bits in the second old ID.

In one subembodiment, a header of a MAC PDU carrying the third message neither comprises the first new ID nor the second new ID.

In one embodiment, a header of a MAC PDU in a X1-th retransmission that carries the third message comprises at least part of bits in the first new ID and at least part of bits in the second new ID; X1 being a positive integer.

In one subembodiment, a header of a MAC PDU in a X1-th retransmission that carries the third message comprises neither the first old ID nor the second old ID.

In one embodiment, expiration of a second privacy timer of the first node is used for starting a link ID update.

In one subembodiment, the action of starting a link ID update includes transmitting a DIRECT LINK IDENTIFIER UPDATE REQUEST message.

In one embodiment, after the first node U01 receives the first message and meanwhile the third message is not received yet, when the second privacy timer of the first node U01 is expired, the first node U01 drops starting a link ID update.

In one subembodiment, the second message transmission does not reach a maximum number of retransmissions.

In one subembodiment, the second message transmission reaches a maximum number of retransmissions, and the second timer is not expired.

In one embodiment, after the first node U01 receives the first message and meanwhile the third message is not received yet, the first node U01 maintains the second privacy timer.

In one subembodiment, the second message transmission does not reach a maximum number of retransmissions.

In one subembodiment, the second message transmission reaches a maximum number of retransmissions, and the second timer is not expired.

In one subembodiment, the action of maintain the second privacy timer comprises reconfiguring the second privacy timer as a response to transmitting the second message; or the action of maintain the second privacy timer comprises reconfiguring the second privacy timer as a response to receiving the third message; or the action of maintain the second privacy timer comprises suspending update of the second privacy timer as a response to transmitting the second message.

In one subembodiment, the second message transmission reaches a maximum number of retransmissions, and the second timer is expired, the first node starts a link ID update.

In one embodiment, an advantage of the above method comprises that identities involved in UE-UE communications can be updated in a timely manner, especially when a message sent by one party is not received by the other.

In one embodiment, the first node U01 determines a maximum number of retransmissions or transmissions of the second message according to internal algorithm.

In one embodiment, the first node U01 determines a maximum number of retransmissions or transmissions of the second message according to network guidelines.

In one embodiment, the second node U02 determines a maximum number of retransmissions or transmissions of the first message according to internal algorithm.

In one embodiment, the second node U02 determines a maximum number of retransmissions or transmissions of the first message according to network guidelines.

In one embodiment, an advantage of the above method comprises the avoidance of conflicts caused by both sides of the UE-UE communications starting link ID updates simultaneously.

In one embodiment, any MAC PDU in the second MAC PDU group comprises at least part of bits in the first old ID and at least part of bits in the second old ID.

In one embodiment, any MAC PDU in the second MAC PDU group comprises neither the first new ID nor the second new ID.

In one embodiment, the third new ID is different from the first new ID.

In one embodiment, the third new ID is different from the first old ID.

In one embodiment, the third new ID is different from the second new ID.

In one embodiment, the third new ID is different from the second old ID.

In one embodiment, the third new ID is the same as the second new ID.

In one embodiment, whether the third new ID is the same as the second new ID depends on whether the first node U01 is a relay.

In one embodiment, a header of any MAC PDU in the second MAC PDU group comprises at least part of bits in the first old ID, at least part of bits in the second old ID and at least part of bits in the third old ID.

In one embodiment, the first MAC PDU group is used for forwarding or relaying an RLC SDU carried by the second MAC PDU group.

In one embodiment, the first MAC PDU group is used for forwarding or relaying an RLC PDU carried by the second MAC PDU group.

In one embodiment, the first MAC PDU group is used for forwarding or relaying a PDCP SDU carried by the second MAC PDU group.

In one embodiment, the first MAC PDU group is used for forwarding or relaying data carried by the second MAC PDU group.

In one embodiment, when a MAC Header of a first MAC PDU in the first MAC PDU group comprises at least part of bits in the third new ID, the MAC Header of the first t MAC PDU does not comprise the first old ID, and the first MAC PDU is any MAC PDU in the first MAC PDU group.

In one embodiment, when a MAC Header of a first MAC PDU in the first MAC PDU group comprises at least part of bits in the third new ID, the MAC Header of the first MAC PDU does not comprise the second old ID, and the first MAC PDU is any MAC PDU in the first MAC PDU group.

In one embodiment, when a MAC Header of a first MAC PDU in the first MAC PDU group comprises at least part of bits in the third new ID, the MAC Header of the first MAC PDU comprises at least part of bits in the first new ID, and the first MAC PDU is any MAC PDU in the first MAC PDU group.

In one embodiment, when a MAC Header of a first MAC PDU in the first MAC PDU group comprises at least part of bits in the third new ID, the MAC Header of the first MAC PDU does not comprise the first new ID, and the first MAC PDU is any MAC PDU in the first MAC PDU group.

In one embodiment, when a MAC Header of a first MAC PDU in the first MAC PDU group comprises at least part of bits in the third new ID, the MAC Header of the first MAC PDU does not comprise the second new ID, and the first MAC PDU is any MAC PDU in the first MAC PDU group.

In one embodiment, the first message comprises a Source layer-2 ID field, the first new ID being an identity indicated by the Source layer-2 ID field.

In one embodiment, after the first old ID is discontinued, the first new ID will be used within a period.

In one embodiment, the phrase of "an application of the first new ID" means that the first new ID is used for identifying a source identity of a MAC PDU received.

In one embodiment, the phrase of "an application of the first new ID" means that the first new ID is used for identifying a destination identity of a MAC PDU transmitted.

In one embodiment, the phrase of "an application of the first new ID" means that the first new ID is used for identifying a unicast link occupied by a MAC PDU transmitted.

In one embodiment, the phrase of "an application of the first new ID" means that the context for a unicast link occupied by a MAC PDU transmitted comprises the first new ID.

In one embodiment, the phrase of "an application of the first new ID" means that the first new ID is used for identifying a transmitter of the first MAC PDU group.

In one embodiment, the phrase of "an application of the first new ID" means that the first new ID is associated with a DRB occupied by the first MAC PDU group.

In one embodiment, the phrase of "an application of the first new ID" means that the first new ID is associated with an SRB occupied by the first MAC PDU group.

In one embodiment, the phrase of "an application of the first new ID" means listening over a MAC PDU that comprises at least part of bits in the first new ID.

In one embodiment, the phrase of "discontinuation of the first old ID" means that the first old ID is no longer used for identifying a source identity of a MAC PDU received.

In one embodiment, the phrase of "discontinuation of the first old ID" means that the first old ID is no longer used for identifying a destination identity of a MAC PDU transmitted.

In one embodiment, the phrase of "discontinuation of the first old ID" means that the first old ID is no longer used for identifying a unicast link occupied by a MAC PDU transmitted.

In one embodiment, the phrase of "discontinuation of the first old ID" means that the context for a unicast link occupied by a MAC PDU transmitted no longer comprises the first old ID.

In one embodiment, the phrase of "discontinuation of the first old ID" means that the first old ID is no longer used for identifying a transmitter of the first MAC PDU group.

In one embodiment, the phrase of "discontinuation of the first old ID" means that the first old ID is no longer associated with a DRB occupied by the first MAC PDU group.

In one embodiment, the phrase of "discontinuation of the first old ID" means that the first old ID is no longer associated with an SRB occupied by the first MAC PDU group.

In one embodiment, the phrase of "discontinuation of the first old ID" means not listening over a MAC PDU comprising at least part of bits in the first old ID any more.

In one embodiment, the phrase of "discontinuation of the first old ID" means that a header of a MAC PDU transmitted does not comprise any bit in the first old ID.

In one embodiment, the phrase of "discontinuation of the first old ID" means that a header of a MAC PDU transmitted does not comprise any bit in the first old ID or any bit in the second old ID.

In one embodiment, the phrase of "discontinuation of the second old ID" means that a header of a MAC PDU transmitted does not comprise any bit in the first old ID or any bit in the second old ID.

In one embodiment, the second message comprises a Source layer-2 ID field, the second new ID being an identity indicated by the Source layer-2 ID field.

In one embodiment, as soon as the second old ID is discontinued, the second new ID will be immediately employed.

In one embodiment, as soon as the second old ID is discontinued, the second new ID will be employed within a period.

In one embodiment, the phrase of "application of the second new ID" means that the second new ID is used for identifying a source identity of a MAC PDU received.

In one embodiment, the phrase of "application of the second new ID" means that the second new ID is used for identifying a destination identity of a MAC PDU transmitted.

In one embodiment, the phrase of "application of the second new ID" means that the second new ID is used for identifying a unicast link occupied by a MAC PDU transmitted.

In one embodiment, the phrase of "application of the second new ID" means that the context for a unicast link occupied by a MAC PDU transmitted comprises the second new ID.

In one embodiment, the phrase of "application of the second new ID" means that the second new ID is used for identifying a transmitter of the first MAC PDU group.

In one embodiment, the phrase of "application of the second new ID" means that the second new ID is associated with a DRB occupied by the first MAC PDU group.

In one embodiment, the phrase of "application of the second new ID" means that the second new ID is associated with an SRB occupied by the first MAC PDU group.

In one embodiment, the phrase of "application of the second new ID" means listening over a MAC PDU that comprises at least part of bits in the second new ID.

In one embodiment, the phrase of "discontinuation of the second old ID" means that the second old ID is no longer used for identifying a source identity of a MAC PDU received.

In one embodiment, the phrase of "discontinuation of the second old ID" means that the second old ID is no longer used for identifying a destination identity of a MAC PDU transmitted.

In one embodiment, the phrase of "discontinuation of the second old ID" means that the second old ID is no longer used for identifying a unicast link occupied by a MAC PDU transmitted.

In one embodiment, the phrase of "discontinuation of the second old ID" means that the context for a unicast link occupied by a MAC PDU transmitted no longer comprises the second old ID.

In one embodiment, the phrase of "discontinuation of the second old ID" means that the second old ID is no longer used for identifying a transmitter of the first MAC PDU group.

In one embodiment, the phrase of "discontinuation of the second old ID" means that the second old ID is no longer associated with a DRB occupied by the first MAC PDU group.

In one embodiment, the phrase of "discontinuation of the second old ID" means that the second old ID is no longer associated with an SRB occupied by the first MAC PDU group.

In one embodiment, the phrase of "discontinuation of the second old ID" means not listening over a MAC PDU comprising at least part of bits in the second old ID any more.

In one embodiment, the phrase of "discontinuation of the second old ID" means that a header of a MAC PDU transmitted does not comprise any bit in the second old ID.

In one embodiment, the phrase of "at least for transmission, the first old ID is updated as the first new ID" means that the first old ID is discontinued for transmission, while the first new ID is employed for transmission.

In one embodiment, the phrase of "at least for transmission, the first old ID is updated as the first new ID" means that the discontinuation of the first old ID and the application of the first new ID are for transmission.

In one embodiment, the phrase of "at least for transmission, the first old ID is updated as the first new ID" means that the discontinuation of the first old ID and the application of the first new ID are respectively for transmission and for reception.

In one embodiment, the phrase of "at least for reception, the first old ID is updated as the first new ID" means that the discontinuation of the first old ID and the application of the first new ID are respectively for transmission and for reception.

In one embodiment, the phrase of "at least for reception, the first old ID is updated as the first new ID" means that the discontinuation of the first old ID and the application of the first new ID are for reception.

In one embodiment, the phrase of "at least for reception, the first old ID is updated as the first new ID" means that the first old ID is no longer used for receiving, while the first new ID is employed for receiving.

In one embodiment, any new MAC PDU is any MAC PDU that comprises at least part of bits in the first new ID and at least part of bits in the second new ID.

In one embodiment, any new MAC PDU is a MAC PDU.

In one embodiment, after the any new MAC PDU is received, the first old ID is updated as the first new ID for reception.

In one embodiment, when the first old ID is updated as the first new ID, the second old ID is updated as the second new ID.

In one subembodiment, after the first old ID is updated as the first new ID, a header of a MAC PDU received comprises at least part of bits in the second new ID and at least part of bits in the first new ID.

In one subembodiment, after the first old ID is updated as the first new ID, a header of a MAC PDU received does not comprise the first old ID or the second old ID.

In one subembodiment, after the first old ID is updated as the first new ID, a MAC PDU received with a MAC Header comprising the first old ID and the second old ID will be dropped or set aside.

In one embodiment, the fourth information is a higher layer signaling, and the fourth information comprises the third new ID; a transmitter of the fourth information is the same as a transmitter of the first PDCP PDU.

In one embodiment, a transmitter of the fourth information is the second node U02; a transmitter of the first PDCP PDU is the second node U02.

In one embodiment, the fourth information is a PC5-S message.

In one embodiment, the fourth information is a PC5-RRC signaling.

In one embodiment, the fourth information is an RRC signaling.

In one embodiment, the second node U02 indicates the third new ID via an upper layer message.

In one embodiment, the fourth information comprises a fourth ID, the fourth ID being a link layer identity.

In one subembodiment, when a header of a MAC PDU in the first MAC PDU group comprises at least part of bits in the third new ID, the header of a MAC PDU in the first MAC PDU group comprises at least part of bits in the fourth ID.

In one subembodiment, the fourth ID identifies a receiver of the first MAC PDU group.

In one subembodiment, the fourth ID identifies a node other than the first node U01 and the second node U02.

In one embodiment, after the third new ID is employed, the fourth ID is employed.

In one embodiment, the third new ID being employed includes that a header of a MAC PDU transmitted by the first node U01 comprises at least part of bits in the third new ID.

In one embodiment, the third new ID being employed includes that a header of a MAC PDU received by the first node U01 comprises at least part of bits in the third new ID.

In one embodiment, the first MAC PDU group is used for forwarding at least part of bits in the first PDCP PDU.

In one embodiment, a head of any MAC PDU in the first MAC PDU group comprises the first old ID or the first new ID, when the first old ID is not updated by the first new ID, a head of any MAC PDU in the first MAC PDU group comprises at least part of bits in the first old ID; when the first old ID is updated by the first new ID, a head of any MAC PDU in the first MAC PDU group comprises at least part of bits in the first new ID and the third new ID is equal to the second new ID.

In one embodiment, after a candidate value of a first field in a MAC PDU transmitted by the first node U01 for forwarding data of a transmitter of the first PDCP PDU is updated, the first field in the MAC PDU transmitted by the first node U01 for forwarding the data of the transmitter of the first PDCP PDU is configured as at least part of bits in the third new ID, not comprising a third old ID.

In one subembodiment, the candidate value of the first field comprises at least part of bits in the third new ID or at least part of bits in the third old ID; the candidate value of the first field being updated includes that the candidate value of the first field is updated from at least part of bits in the third old ID to at least part of bits in the third new ID.

In one subembodiment, after being updated the candidate value of the first field is at least part of bits in the third new ID.

In one embodiment, before a candidate value of a first field in a MAC PDU transmitted by the first node U01 for forwarding data of a transmitter of the first PDCP PDU is updated, the first field in the MAC PDU transmitted by the first node U01 for forwarding the data of the transmitter of the first PDCP PDU is configured as at least part of bits in the third old ID, not comprising the third new ID; the third old ID is different from the third new ID.

In one subembodiment, before being updated the candidate value of the first field is at least part of bits in the third old ID.

In one embodiment, the first old ID and the second old ID are discontinued simultaneously; the first new ID and the second new ID are applied simultaneously.

In one embodiment, when the first new ID is used for transmitting, a MAC Header of a MAC PDU transmitted by the first node U01, if comprising at least part of bits in the first new ID and at least part of bits in the second new ID, won't comprise the first old ID and the second old ID.

In one embodiment, when the first new ID is used for receiving, a MAC Header of a MAC PDU received by the first receiver, if comprising at least part of bits in the first new ID and at least part of bits in the second new ID, won't comprise the first old ID and the second old ID.

In one embodiment, the first node U01 receives a first signaling, the first signaling indicating that the third ID is employed.

In one embodiment, the first node U01 receives a second signaling, the second signaling indicating that an RLC entity corresponding to an RB of the second PDCP PDU performs a first operation, when the first operation is completed, the third ID is employed.

In one subembodiment, the first operation comprises clearing/discarding/deleting an RLCI SDU buffered in an RLC entity corresponding to an RB of the second PDCP PDU.

In one subembodiment, the first operation comprises clearing/discarding/deleting a segment of an RLC SDU buffered in an RLC entity corresponding to an RB of the second PDCP PDU.

In one subembodiment, the first operation comprises re-establishing an RLC entity corresponding to an RB of the second PDCP PDU.

In one subembodiment, the first operation comprises configuring a field for indicating the first key ID in a PDCP PDU comprised by an RLC SDU buffered in an RLC entity corresponding to an RB of the second PDCP PDU to be the second key ID.

In one embodiment, the fourth information comprises a first logical channel ID, when a header of a MAC PDU in the first MAC PDU group comprises at least part of bits in the third new ID and at least part of bits in the fourth ID, the header of a MAC PDU in the first MAC PDU group comprises the first logical channel ID.

In one embodiment, when the first old ID is updated as the first new ID, the first node U01 clears up an RLC SDU comprising the first PDCP PDU; the first node U01 receives the third PDCP PDU, the third PDCP PDU comprises at least part of bits in the first PDCP PDU, and a header of the third PDCP PDU comprises the second key ID.

In one subembodiment, the third PDCP PDU and the first PDCP PDU comprises a same PDCP SDU.

In one subembodiment, a payload of the third PDCP PDU comprises at least part of bits in a payload of the first PDCP PDU.

In one embodiment, the payload is data.

In one embodiment, the second node retransmits a PDCP SDU of the first PDCP PDU.

In one embodiment, the first node U01 explicitly indicates an RLC SDU to be cleared or discarded to the second node U02.

In one subembodiment, as a response to receiving the RLC SDU to be cleared or discarded indicated by the first node U01, the second node U02 transmits the third PDCP PDU.

In one subembodiment, the first node U01 indicates an RLC SDU to be cleared or discarded by a status report of RLC.

In one subembodiment, the second node U02 requests the first node U01 through polling to send an RLC status report so as to indicate the RLC SDU to be cleared or discarded.

In one embodiment, a receiver of the first MAC PDU group explicitly indicates a PDCP SDU to be cleared or discarded or not received yet to the second node U02.

In one subembodiment, as a response to receiving the PDCP SDU to be cleared or discarded or not received yet, the second node U02 transmits the third PDCP PDU.

In one subembodiment, a receiver of the first MAC PDU group indicates the PDCP SDU to be cleared or discarded or not received yet through a PDCP status report.

In one subembodiment, the second node U02 requests the receiver of the first MAC PDU group to transmit the PDCP status report so as to indicate the PDCP SDU to be cleared or discarded or not received yet.

In one subembodiment, the third old ID being updated as the third new ID is used to trigger transmission of the PDCP status report by a receiver of the first MAC PDU group.

In one embodiment, the action of clearing up includes deleting.

In one embodiment, the action of clearing up includes clearing.

In one embodiment, the action of clearing up includes discarding.

In one embodiment, after the first old ID is updated as the first new ID, the first node U01 re-establishes an RLC entity corresponding to an RLC SDU comprising the first PDCP PDU; the first node U01 receives a fourth PDCP PDU, the fourth PDCP PDU comprising at least part of bits in the first PDCP PDU; a header of the fourth PDCP PDU comprises the second key ID.

In one subembodiment, the fourth PDCP PDU and the first PDCP PDU comprise a same PDCP SDU.

In one subembodiment, a payload of the fourth PDCP PDU comprises at least part of bits in a payload of the first PDCP PDU.

In one embodiment, the payload is data.

In one embodiment, the second node retransmits a PDCP SDU of the first PDCP PDU.

In one embodiment, the first node U01 explicitly indicates an RLC SDU to be cleared or discarded or lost to the second node U02.

In one subembodiment, as a response to receiving the RLC SDU to be cleared or discarded or lost indicated by the first node U01, the second node U02 transmits the fourth PDCP PDU.

In one subembodiment, the first node U01 indicates an RLC SDU to be cleared or discarded or lost by a status report of RLC.

In one subembodiment, the second node U02 requests the first node U01 through polling to send an RLC status report so as to indicate the RLC SDU to be cleared or discarded or lost.

In one embodiment, a receiver of the first MAC PDU group explicitly indicates a PDCP SDU to be cleared or discarded or not received yet to the second node U02.

In one subembodiment, as a response to receiving the PDCP SDU to be cleared or discarded or not received yet, the second node U02 transmits the fourth PDCP PDU.

In one subembodiment, a receiver of the first MAC PDU group indicates the PDCP SDU to be cleared or discarded or not received yet through a PDCP status report.

In one subembodiment, the second node U02 requests the receiver of the first MAC PDU group to transmit the PDCP status report so as to indicate the PDCP SDU to be cleared or discarded or not received yet.

In one subembodiment, the third old ID being updated as the third new ID is used to trigger transmission of the PDCP status report by a receiver of the first MAC PDU group.

In one embodiment, after the first old ID is updated as the first new ID, when an RB used by the first PDCP PDU is an SRB, the first node clears up an RLC SDU comprising the first PDCP PDU, or, the first node re-establishes an RLC entity corresponding to an RLC SDU of the first PDCP PDU; when an RB used by the first PDCP PDU is a DRB, the first node configures the first key ID comprised by a header of the first PDCP PDU as the second key ID.

In one embodiment, after the first old ID is updated as the first new ID, when an RB used by the first PDCP PDU is an AM RB, the first node clears up an RLC SDU comprising the first PDCP PDU, or, the first node re-establishes an RLC entity corresponding to an RLC SDU of the first PDCP PDU; when an RB used by the first PDCP PDU is a UM RB, the first node configures the first key ID comprised by a header of the first PDCP PDU as the second key ID.

In one embodiment, the first node U01 is a L2 Relay.

In one embodiment, the first node U01 receives a second physical layer signaling, the second physical layer signaling comprising configuration information of a second channel, the first MAC PDU group is transmitted on the first channel; the second physical layer signaling and any MAC PDU in the first MAC PDU group jointly comprise the third new ID.

In one subembodiment, the second physical layer signaling and any MAC PDU in the second MAC PDU group jointly comprise the fourth ID.

In one subembodiment, the second physical layer signaling comprises Downlink Control Information (DCI).

In one subembodiment, the second physical layer signaling comprises Sidelink Control Information (SCI).

In one subembodiment, a physical layer channel occupied by the second physical layer signaling includes a PSCCH.

In one subembodiment, a physical layer channel occupied by the second physical layer signaling includes a PDCCH.

In one subembodiment, the second physical layer signaling comprises time-frequency resource information occupied by the first MAC PDU.

In one subembodiment, the second physical layer signaling comprises scheduling information of the first MAC PDU.

In one subembodiment, the second channel includes a PDSCH.

In one subembodiment, the second channel includes a PSSCH.

In one subembodiment, the configuration information of the second channel comprises time-frequency resource information.

In one subembodiment, the configuration information of the second channel comprises RV information.

In one subembodiment, the configuration information of the second channel comprises NDI information.

In one subembodiment, the configuration information of the second channel comprises HARQ information.

In one subembodiment, the second physical layer signaling comprises N1 LSB in the third new ID, while any MAC PDU in the first MAC PDU group comprises all bits other than the N1 LSB in the third new ID, N1 being an integer greater than 0.

In one subembodiment, the second physical layer signaling comprises N2 MSB in the fourth ID, while any MAC PDU in the first MAC PDU group comprises all bits other than the N2 MSB in the fourth ID, N2 being an integer greater than 0.

In one embodiment, in the procedure of changing the first key ID to the second key ID, an RLC entity corresponding to an RB employed by the first MAC PDU group is not re-established.

In one embodiment, in the procedure of changing the first key ID to the second key ID, a PDCP entity corresponding to an RB employed by the first MAC PDU group is not re-established.

In one embodiment, an advantage of the above method includes the avoidance of privacy risks caused by forwarding the data of the second node U02 using the first key ID with a new link layer ID.

In one embodiment, the fourth information is an RRC message or a PC5-S message, and the fourth information comprises part of fields in DIRECT LINK IDENTIFIER UPDATE REQUEST.

In one embodiment, the fourth information is an RRC message or a PC5-S message, and the fourth information comprises part of fields in DIRECT LINK IDENTIFIER UPDATE ACCEPT.

In one embodiment, the fourth information is an RRC message or a PC5-S message, and the fourth information comprises part of fields in DIRECT LINK IDENTIFIER UPDATE ACK.

Embodiment 6

Figures 6, 7:
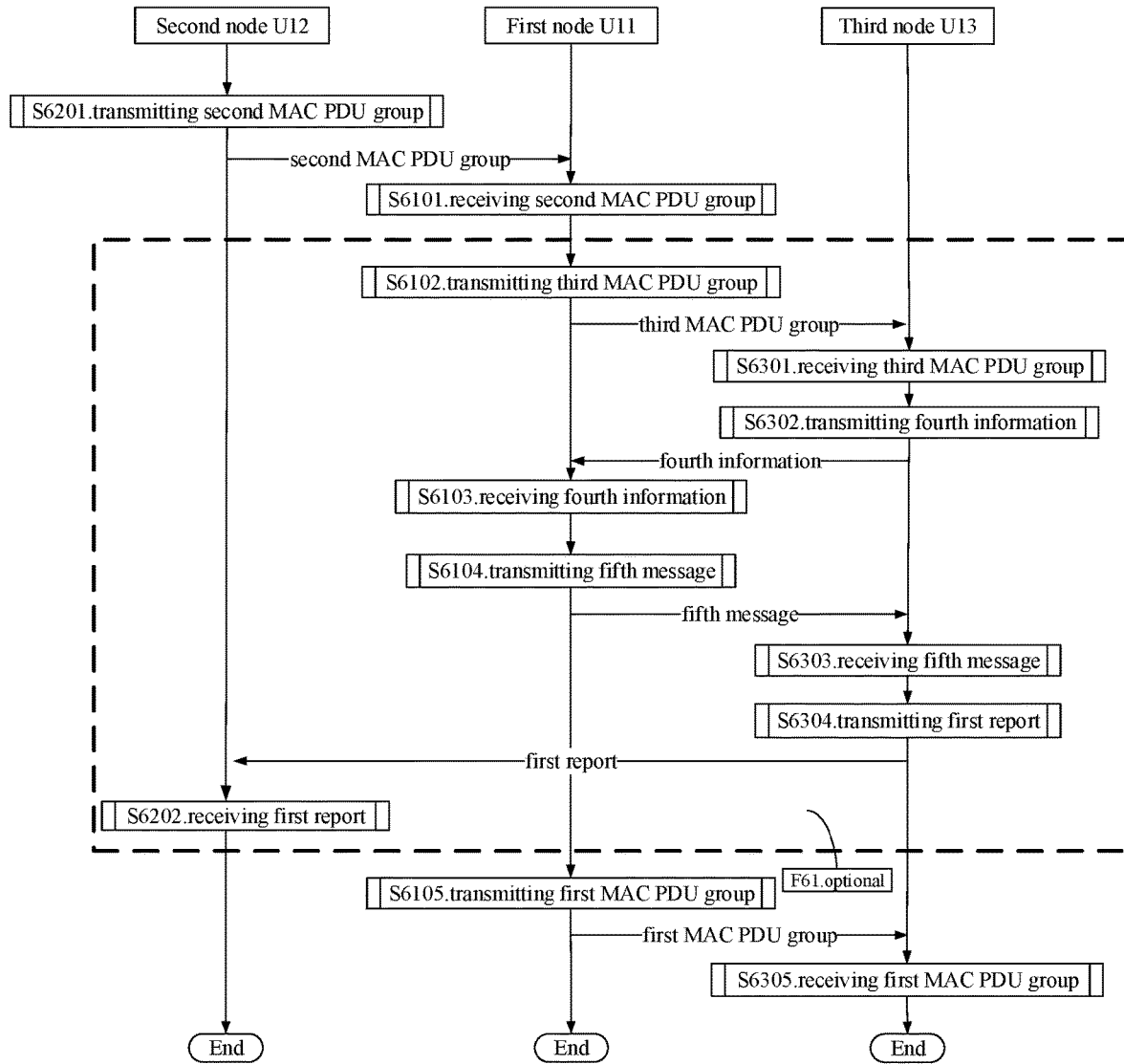
FIG. 6 illustrates a flowchart of a radio signal transmission according to one embodiment of the present disclosure.
FIG. 7 illustrates a schematic diagram of a field in a PDCP PDU related to security algorithm according to one embodiment of the present disclosure.

Embodiment 6 illustrates a flowchart of a radio signal transmission according to one embodiment of the present disclosure, as shown in FIG. 6. In FIG. 6, U11 corresponds to a first node in the present disclosure, U12 corresponds to a second node in the present disclosure, and U13 corresponds to a receiver of a first MAC PDU group in the present disclosure; it should be particularly noted that the sequential order illustrated herein does not necessarily imply an order of signal transmissions and implementations; herein, steps marked by F61 are optional. With the basis of Embodiment 5, Embodiment 6 will involve some embodiments of the Embodiment 5 without further elaborations.

The first node U11 receives a second MAC PDU group in step S6101; and transmits a third MAC PDU group in step S6102; receives fourth information in step S6103; transmits a fifth message in step S6104; and transmits a first MAC PDU group in step S6105.

The second node U12 transmits the second MAC PDU group in step S6201; and receives a first report in step S6202.

The third node U13 receives the third MAC PDU group in step S6301; transmits the fourth information in step S6302; and receives the fifth message in step S6303; transmits the first report in step S6304; and receives the first MAC PDU group in step S6305.

In one embodiment, the first node U11 is a relay node.

In one embodiment, the first node U11 forwards data transmitted from the second node U12 to the third node U13.

In one embodiment, the second MAC PDU group comprises data required to be transmitted to the third node U13.

In one embodiment, the third node U13 is a UE.

In one embodiment, the third node U13 is a target node.

In one embodiment, the third node U13 is a remote UE.

In one embodiment, the third node U13 is a base station

In one embodiment, an interface for communications between the first node U11 and the third node U13 includes a PC5.

In one embodiment, an interface for communications between the first node U11 and the third node U13 includes a Uu.

In one embodiment, a physical channel occupied by the third MAC PDU group includes a PSSCH.

In one embodiment, a physical channel occupied by the third MAC PDU group includes a PSCCH.

In one embodiment, a physical channel occupied by the third MAC PDU group includes a PUSCH.

In one embodiment, a physical channel occupied by the third MAC PDU group includes a PUCCH.

In one embodiment, a transmission channel occupied by the third MAC PDU group includes a SL-SCH.

In one embodiment, a transmission channel occupied by the third MAC PDU group includes a DCH.

In one embodiment, a transmission channel occupied by the third MAC PDU group includes a CCH.

In one embodiment, a logical transmission channel occupied by the third MAC PDU group includes a SCCH.

In one embodiment, a logical transmission channel occupied by the third MAC PDU group includes a STCH.

In one embodiment, a logical transmission channel occupied by the third MAC PDU group includes a DCCH.

In one embodiment, a logical transmission channel occupied by the third MAC PDU group includes a DTCH.

In one embodiment, the third MAC PDU group comprises a first RLC SDU group, the first RLC SDU group comprising a first old PDCP PDU with a header comprising the first key ID and not the second key ID.

In one embodiment, the first node U11 transmits the third MAC PDU group after the first receiver receives the third message, and the first old ID being updated as the first new ID is performed after the first transmitter transmits the third MAC PDU group.

In one embodiment, the first node U11 firstly receives the third message, and secondly transmits the third MAC PDU group; after the first node U11 completes the transmission of the third MAC PDU group, the first old ID will be updated as the first new ID.

In one embodiment, the first node U11 firstly receives the third message, and secondly transmits the third MAC PDU group; after the first node U11 completes the transmission of the third MAC PDU group, a MAC PDU transmitted by the first node U11 does not comprise the first old ID or the second old ID, besides, the MAC PDU transmitted by the first node U11 comprises at least part of bits in the first new ID and at least part of bits in the second new ID.

In one subembodiment, a receiver of the MAC PDU transmitted by the first node U11 that comprises at least part of bits in the first new ID and at least part of bits in the second new ID is the second node U12.

In one embodiment, the first node U11 firstly receives the third message, and secondly transmits the third MAC PDU group; after the first node U11 completes the transmission of the third MAC PDU group, a MAC PDU transmitted by the first node U11 does not comprise the first old ID or the second old ID, besides, the MAC PDU transmitted by the first node U11 comprises at least part of bits in the third new ID and at least part of bits in the fourth new ID.

In one subembodiment, a receiver of the MAC PDU transmitted by the first node U11 that comprises at least part of bits in the third new ID and at least part of bits in the fourth new ID is the third node U13.

In one subembodiment, the fourth ID identifies the third node U13.

In one subembodiment, the third new ID identifies the first node U11.

In one embodiment, a header of the third MAC PDU group comprises at least part of bits in the third old ID; and the header of the third MAC PDU group does not comprise the fourth ID or the third new ID.

In one embodiment, the fourth information is a PC5-S message.

In one embodiment, the fourth information is DIRECT LINK IDENTIFIER UPDATE REQUEST.

In one embodiment, the fourth information is DIRECT LINK IDENTIFIER UPDATE ACCEPT.

In one embodiment, the fifth message is DIRECT LINK IDENTIFIER UPDATE ACCEPT.

In one embodiment, the fifth message is DIRECT LINK IDENTIFIER UPDATE ACK.

In one embodiment, the fourth information comprises part of fields in DIRECT LINK IDENTIFIER UPDATE REQUEST.

In one embodiment, the fourth information comprises part of fields in DIRECT LINK IDENTIFIER UPDATE ACCEPT.

In one embodiment, the fourth information is used for triggering transmission of the fifth message.

In one embodiment, a header of a MAC PDU bearing the fourth information comprises at least part of bits in the third old ID.

In one embodiment, a header of a MAC PDU bearing the fourth information comprises at least part of bits in the third new ID.

In one embodiment, a header of a MAC PDU bearing the fifth message comprises at least part of bits in the third old ID.

In one embodiment, a header of a MAC PDU bearing the fifth message comprises at least part of bits in the third new ID.

In one embodiment, a header of a MAC PDU bearing the fourth information only comprises identities other than the third old ID and the third new ID.

In one embodiment, when the fourth information is received, the third new ID is employed.

In one embodiment, after the fifth message is transmitted, the third new ID is employed.

In one embodiment, when the first node U11 transmits the first MAC PDU group after the employment of the third new ID, a header of any MAC PDU in the first MAC PDU group comprises at least part of bits in the fourth new ID and at least part of bits in the third new ID.

In one embodiment, the first report comprises a PDCP status report.

In one embodiment, the first report comprises an RLC status report.

In one embodiment, the link layer ID being updated is used to trigger transmission of the first report.

In one embodiment, as a response to reception of the first report, the second node U12 transmits or retransmits an SDU not yet received.

In one subembodiment, the first report indicates an SDU not yet received.

In one subembodiment, the SDU not yet received comprises a PDCP SDU.

In one subembodiment, the SDU not yet received comprises an RLC SDU.

In one embodiment, the first old ID is updated as the first new ID, and the second old ID is updated as the second new ID.

In one subembodiment, the first MAC PDU group is transmitted after the first old ID being updated as the first new ID, a MAC Header of the first MAC PDU group comprises at least part of bits in the first new ID and at least part of bits in the second new ID.

In one embodiment, the first MAC PDU group carries data transmitted from the second node U12 to the third node U13.

In one embodiment, the fourth information indicates the fourth ID.

Embodiment 7

Embodiment 7 illustrates a schematic diagram of a field in a PDCP PDU related to security algorithm according to one embodiment of the present disclosure. As shown in FIG. 7, a field "$K_{NPR\text{-}sess}$ ID" and a field "LSBs of counter" are carried by a header of a PDCP PDU; a field "Ciphered payload" carries an encrypted payload; a field "Ciphered MAC (if required)" carries an encrypted message authentication code. It should be particularly noted that the MAC contained in the field "Ciphered MAC (if required)" refers to Message Authentication Code, rather than Medium Access Control.

In one embodiment, the field "KNPR-sess ID" is a field that comprises the first key ID.

In one embodiment, an element comprised by a PDU is called Field.

In one embodiment, a field "$K_{NRP\text{-}sess}$ ID" in a header of any PDCP PDU comprised or carried by the first MAC PDU group is configured as the second key ID.

In one embodiment, a field "$K_{NRP\text{-}sess}$ ID" in a header of any PDCP PDU comprised or carried by the second MAC PDU group is configured as the first key ID.

In one embodiment, a field "$K_{NRP\text{-}sess}$ ID" in a header of any PDCP PDU comprised or carried by the third MAC PDU group is configured as the first key ID.

In one embodiment, the field "LSBs of counter" indicates or corresponds to a Sequence Number (SN) of a PDCP PDU.

In one embodiment, the field "LSBs of counter" is a Sequence Number (SN) of a PDCP PDU.

In one embodiment, a first RLC SDU group carries the first PDCP PDU.

In one embodiment, after the first old ID is updated as the first new ID, when the first node clears the first RLC SDU group, the field "LSBs of counter" is set to an initial value.

In one embodiment, after the first old ID is updated as the first new ID, when the first node clears the first RLC SDU group, the field "LSBs of counter" in a new PDCP PDU transmitted by a PDCP entity of an RB corresponding to the first RLC SDU group is set to a specific modified value.

In one subembodiment, the specific modified value is a sum of a current value and a designated offset being modulo a probable maximum value of the field "LSBs of counter".

In one subembodiment, after performing the first operation, the specific modified value fulfills (TX_NEXT+D1) modulo $2^S$; herein, TX_NEXT is a status variant of the PDCP entity, which indicates a COUNT value of a next PDCP SDU to be transmitted, where D1 is a positive integer, S is the number of bits occupied by the field "LSBs of counter", and modulo represents modulo operation.

In one subembodiment, upon reception of a PDCP PDU comprising the second key ID, a value of the field "LSBs of counter" in a header of the PDCP PDU comprising the second key ID is used to determine at least part of LSBs in the COUNT value.

In one subembodiment, upon reception of a PDCP PDU comprising the second key ID, a value of the field "LSBs of counter" in a header of the PDCP PDU comprising the second key ID is used to determine a RCVD_SN.

In one subembodiment, upon reception of a PDCP PDU comprising the second key ID, a value of the field "LSBs of counter" in a header of the PDCP PDU comprising the second key ID is used to determine a RCVD_SN; herein, the RCVD_SN=(LSN-D1+$2^S$) modulo $2^S$, where LSN is the value of the field "LSBs of counter".

In one embodiment, when the first old ID is updated as the first new ID, the first node configures each field "$K_{NRP\text{-}sess}$ ID" in headers of all first PDCP PDUs to be the second key ID.

In one embodiment, the value of D1 is a fixed one.

In one embodiment, the value of D1 is explicitly determined by a PC5-S signaling in the procedure of direct link establishment.

In one embodiment, the value of D1 is indicated by the first message.

In one embodiment, the value of D1 is indicated by the second message.

In one embodiment, the value of D1 is indicated by the third message.

In one embodiment, the value of D1 is indicated by the fourth information.

In one embodiment, the value of D1 is dependent on the second key ID, or the value of D1 is generated by the second key ID.

In one embodiment, a first RLC entity is an RLC entity corresponding to an RLC PDU comprised by the first MAC PDU group.

In one embodiment, when the third new ID is employed, a value of an SN comprised by a header of an RLC PDU comprised by the first MAC PDU group is set to (TX_Next+D2) modulo $2^T$, where TX_Next is a status variant of the first RLC entity, and the TX_Next stores a SN value of a latest generated PDU, D2 being a positive integer, T being a number of digits in the SN of an RLC PDU header transmitted by the first RLC entity, and modulo represents modulo operation.

In one embodiment, the value of D2 is a fixed one.

In one embodiment, the value of D2 is explicitly determined by a PC5-S signaling in the procedure of direct link establishment.

In one embodiment, the value of D2 is indicated by the first message.

In one embodiment, the value of D2 is indicated by the second message.

In one embodiment, the value of D2 is indicated by the third message.

In one embodiment, the value of D2 is indicated by the fourth information.

In one embodiment, the value of D2 is indicated by the RRC signaling.

In one embodiment, the value of D2 is dependent on the second key ID, or the value of D2 is generated by the second key ID.

In one embodiment, after the first old ID is updated as the first new ID, a value of an SN comprised by a header of an RLC PDU transmitted by the first RLC entity is set as an initial value.

In one subembodiment, the initial value is 0.

In one embodiment, when the third new ID is employed, the first RLC entity sets the COUNT as an initial value.

In one embodiment, when the third new ID is employed, the first RLC entity sets the TX_NEXT as an initial value.

In one subembodiment, a receiver of the first MAC PDU group is used to indicate that the first RLC entity sets the TX_NEXT as an initial value, and, as a response, the receiver of the first MAC PDU group sets a RX_NEXT in an RLC entity corresponding to an RLC SDU comprised by the first MAC PDU group as an initial value.

In one embodiment, an advantage of the above method includes that the SN in PDCP PDU is configured to have no connection with an SN in a PDCP PDU which used a first old ID and a second old ID previously for communications, thus improving privacy performance.

In one embodiment, an advantage of the above method includes that the SN in RLC PDU is configured to have no connection with an SN in an RLC PDU which used a first old ID and a second old ID previously for communications, thus improving privacy performance.

In one embodiment, a field in a PDCP PDU related to security algorithm in FIG. 7 is applicable to the first PDCP PDU.

In one embodiment, a field in a PDCP PDU related to security algorithm in FIG. 7 is applicable to the second PDCP PDU.

In one embodiment, a field in a PDCP PDU related to security algorithm in FIG. 7 is applicable to the third PDCP PDU.

In one embodiment, a field in a PDCP PDU related to security algorithm in FIG. 7 is applicable to the fourth PDCP PDU.

In one embodiment, a field in a PDCP PDU related to security algorithm in FIG. 7 is applicable to the first old PDCP PDU.

Embodiment 8

Embodiment 8 illustrates a schematic diagram of a MAC PDU according to one embodiment of the present disclosure, as shown in FIG. 8.

In Embodiment 8, a MAC PDU comprises one MAC Header and at least one MAC subPDU; the MAC Header comprising a source ID, a destination ID and other bits.

In one embodiment, the MAC PDU is transmitted on a SideLink Shared CHannel.

In one embodiment, a number of bits comprised by the MAC Header is fixed.

In one embodiment, the number of bits comprised by the MAC Header is 32.

In one embodiment, the MAC Header is an SL-SCH MAC subheader.

In one embodiment, the other bits comprise 5 fields, which are V, R, R, R and R, respectively comprising 4 bits, 1 bit, 1 bit, 1 bit and 1 bit.

In one embodiment, the source ID and the destination ID respectively comprise 16 bits and 8 bits.

In one embodiment, the source ID in the MAC Header and the destination ID in the MAC Header are respectively a SRC field and a DST field.

In one embodiment, each MAC subPDU comprises a MAC subheader and a MAC SDU, and the MAC subheader in each MAC subPDU comprises a field of Logical Channel IDentifier (LCID), the LCID field indicating a channel identity of a logical channel for a corresponding MAC SDU.

In one embodiment, a SRC field in the MAC Header can comprise at least part of bits in the first new ID.

In one embodiment, a SRC field in the MAC Header can comprise at least part of bits in the third new ID.

In one embodiment, a DST field in the MAC Header can comprise at least part of bits in the second new ID.

In one embodiment, a DST field in the MAC Header can comprise at least part of bits in the fourth new ID.

In one embodiment, the LCID field comprises 5 bits.

In one embodiment, the LCID field comprises 6 bits.

In one embodiment, each MAC PDU is also allowed to comprise a padding bit.

In one embodiment, a MAC subPDU comprises an RLC PDU.

In one embodiment, a MAC subPDU comprises a MAC CE.

In one embodiment, the MAC PDU in FIG. 8 is a MAC PDU in the first MAC PDU group in the present disclosure.

In one subembodiment, the first MAC PDU at least comprises a first MAC subPDU.

In one embodiment, the MAC PDU in FIG. 8 is a MAC PDU in the second MAC PDU group in the present disclosure.

In one subembodiment, the second MAC PDU at least comprises a second MAC subPDU.

In one embodiment, the MAC PDU in FIG. 8 is a MAC PDU in the third MAC PDU group in the present disclosure.

In one subembodiment, the second MAC PDU at least comprises a second MAC subPDU.

In one embodiment, the MAC PDU in FIG. 8 is any new MAC PDU in the present disclosure.

In one subembodiment, the second MAC PDU at least comprises a second MAC subPDU.

In one embodiment, a source ID comprised by the MAC PDU in FIG. 8 is part of bits in the first old ID in the present disclosure.

In one embodiment, a destination ID comprised by the MAC PDU in FIG. 8 is part of bits in the second old ID in the present disclosure.

In one embodiment, a source ID comprised by the MAC PDU in FIG. 8 is part of bits in the first new ID in the present disclosure.

In one embodiment, a source ID comprised by the MAC PDU in FIG. 8 is part of bits in the third new ID in the present disclosure.

In one embodiment, a destination ID comprised by the MAC PDU in FIG. 8 is part of bits in the second new ID in the present disclosure.

Embodiment 9

Embodiment 9 illustrates a schematic diagram of generating a third new ID according to a first parameter set according to one embodiment of the present disclosure, as shown in FIG. 9.

In one embodiment, the first node generates a third new ID according to the first parameter set.

In one embodiment, the first ID set is a subset of the first parameter set.

In one embodiment, the second node indicates the first parameter set.

In one embodiment, there is at least one parameter in the first parameter set being generated locally by the first node.

In one embodiment, there is at least one parameter in the first parameter set in no need of signaling indication.

In one embodiment, there is at least one parameter in the first parameter set being fixed.

In one embodiment, the second node or networks where it stays indicates a first generation parameter, the first parameter set comprising the first generation parameter.

In one embodiment, the first generation parameter is a random seed.

In one embodiment, the first generation parameter is a bit range of identities.

In one embodiment, the first generation parameter is an identifier of algorithm used for generating the third new ID.

In one embodiment, for the first parameter set that is given, the third new ID is determined.

In one embodiment, the third new ID is generated by a first function with the first parameter set employed as an input.

In one embodiment, the first function is fixed.

In one embodiment, the first function is in no need of signaling configuration.

In one embodiment, the first function is configurable.

In one embodiment, the first function is configured by the second node.

In one embodiment, the first parameter set comprises the first ID set.

In one embodiment, the first ID set comprises a first new ID.

In one embodiment, the first ID set comprises a fourth ID.

In one embodiment, the first new ID determines a transmitter of the second MAC PDU group, while the fourth ID determines a receiver of the first MAC PDU group.

In one embodiment, the third new ID is a combination of the first new ID and the fourth ID.

In one embodiment, V1 MSB(s) in the third new ID is(are) from V1 MSB(s) in the first new ID, and V2 LSB(s) in the third new ID is(are) from V2 LSB(s) in the fourth ID, where V1 and V2 are both positive integers.

In one embodiment, V1 MSB(s) in the third new ID is(are) from V1 LSB(s) in the first new ID, and V2 LSB(s) in the third new ID is(are) from V2 MSB(s) in the fourth ID, where V1 and V2 are both positive integers.

In one embodiment, V1 MSB(s) in the third new ID is(are) from V1 MSB(s) in the fourth ID, and V2 LSB(s) in the third new ID is(are) from V2 LSB(s) in the first new ID, where V1 and V2 are both positive integers.

In one embodiment, V1 MSB(s) in the third new ID is(are) from V1 LSB(s) in the fourth ID, and V2 LSB(s) in the third new ID is(are) from V2 MSB(s) in the first new ID, where V1 and V2 are both positive integers.

In one embodiment, the third new ID is a combination of Z1 MSB(s) in the first new ID and (Z−Z1) LSB(s) in the fourth ID, where Z refers to a number of bits comprised by the third new ID, and Z1 is a positive integer less than Z.

In one embodiment, Z is equal to 24, and Z1 is equal to 8.

In one embodiment, Z is equal to 24, and Z1 is equal to 16.

In one embodiment, the third new ID is a combination of Z2 LSB(s) in the first new ID and (Z−Z2) MSB(s) in the fourth ID, where Z refers to a number of bits comprised by the third new ID, and Z2 is a positive integer less than Z.

In one embodiment, Z is equal to 24, and Z2 is equal to 8.

In one embodiment, Z is equal to 24, and Z2 is equal to 16.

In one embodiment, at least E bits in the third new ID is obtained by modulo-2 addition between E bits in the first new ID and E bits in the fourth ID, where E is a positive integer greater than 0.

In one subembodiment, E is equal to 24.

In one subembodiment, E is equal to 8.

In one subembodiment, E is equal to 16.

In one subembodiment, an e-th bit among the E bits in the third new ID is obtained by modulo-2 addition between an e-th bit among the E bits in the first new ID and an e-th bit among the E bits in the fourth ID.

In one subembodiment of the above embodiments, the e-th bit is any one of the E bits.

In one subembodiment of the above embodiments, the e-th bit is an e-th MSB among the E bits.

In one embodiment, at least E bits in the third new ID are obtained by modulo-2 addition between E bits in the first new ID and E bits and E random bits in the fourth ID, where E is a positive integer greater than 0.

In one subembodiment, E is equal to 24.

In one subembodiment, E is equal to 8.

In one subembodiment, E is equal to 16.

In one subembodiment, the E random bits are determined by the first generation parameter.

In one subembodiment, an e-th bit among the E bits in the third new ID is obtained by modulo-2 addition between an e-th bit among the E bits in the first new ID and an e-th bit among the E bits in the fourth ID.

In one subembodiment of the above embodiments, the e-th bit is any one of the E bits.

In one subembodiment of the above embodiments, the e-th bit is an e-th MSB among the E bits.

In one embodiment, the third new ID is obtained by modulo-2 addition between the first new ID being first cyclic shifted by C1 bit(s) and the fourth ID being second cyclic shifted by C2 bit(s).

In one subembodiment, C1 is an integer greater than or equal to 0.

In one subembodiment, C2 is an integer greater than or equal to 0.

In one subembodiment, at least one of C1 and C2 is greater than 0.

In one subembodiment, the first cyclic shift is either left cyclic shift or right cyclic shift.

In one subembodiment, the second cyclic shift is either left cyclic shift or right cyclic shift.

In one embodiment, the third new ID is obtained by interleaving of I1 bit(s) in the first new ID and I2 bit(s) in the fourth ID, herein, I1 and I2 are positive integers greater than 0 and a sum of I1+I2 is equal to a length of the third new ID.

In one subembodiment, I1=I2, when an n1-th bit in the third new ID is from the first new ID, a (n1+1)-th bit in the third new ID is from the fourth ID; when an n2-th bit in the third new ID is from the fourth ID, a (n2+1)-th bit in the third new ID is from the first new ID; herein, both n1 and n2 are positive integers greater than 0.

In one subembodiment, I1=A1*I2, when an n1-th bit through a (n1+A1−1)-th bit in the third new ID are from the first new ID, a (n1+A1)-th bit in the third new ID is from the fourth ID; when a n2-th bit in the third new ID is from the fourth ID, a (n2+1) bit through a (n2+A1)-th bit in the third new ID are from the first new ID; herein, both n1 and n2 are positive integers greater than 0, and A1 is a positive integer.

In one subembodiment, I2=A2*I1, when an n1-th bit in the third new ID is from the first new ID, a (n1+1)-th bit through a (n1+A2)-th bit in the third new ID are from the fourth ID; when a n2-th bit through a (n2+A2−1)-th bit in the third new ID are from the fourth ID, a (n2+A2)-th bit in the third new ID is from the first new ID; herein, both n1 and n2 are positive integers greater than 0, and A2 is a positive integer.

In one subembodiment, values of I1 and I2 are related to the first time information.

In one subembodiment, a proportional relation between I1 and I2 is related to the first time information.

In one subembodiment, the value of I1 is a DFN determined by the first time information mod T1, where T1 is a positive integer.

In one subembodiment, T1 is equal to 8.

In one subembodiment, T1 is equal to 12.

In one subembodiment, T1 is equal to 16.

In one subembodiment, T1 is equal to 24.

In one subembodiment, a ratio of I1 to I2 is a DFN determined by the first time information mod T2, where T2 is a positive integer.

In one subembodiment, a ratio of I2 to I1 is a DFN determined by the first time information mod T2, where T2 is a positive integer.

In one subembodiment, T2 is equal to 1.

In one subembodiment, T2 is equal to 2.

In one subembodiment, T2 is equal to 3.

In one subembodiment, T2 is equal to 4.

In one subembodiment, T2 is equal to 6.

In one embodiment, the first time information determines a first bit sequence, and a length of the first bit sequence is equal to a length of the third new ID.

In one embodiment, the first time information comprises a DFN, and the first bit sequence comprises at least part of bits in the DFN.

In one subembodiment, KK1 LSB(s) in the first bit sequence is(are) from the DFN, and other bits in the first bit sequence are all-0 or all-1, where KK1 is a length of DFN.

In one embodiment, the first time information comprises an SFN, and the first bit sequence comprises at least part of bits in the SFN.

In one subembodiment, KK2 LSB(s) in the first bit sequence is(are) from the SFN, and other bits in the first bit sequence are all-0 or all-1, where KK2 is a length of SFN.

In one embodiment, values of bits in the first bit sequence are used to determine whether a bit corresponding to the third new ID is from the first new ID or the fourth ID.

In one subembodiment, a bx-th bit in the first bit sequence is of a value of 0, and a bx-th bit in the third new ID is from the first new ID; a bx-th bit in the first bit sequence is of a value of 1, and a bx-th bit in the third new ID is from the fourth ID, where the bx-th bit is any bit in the first bit sequence.

In one subembodiment, a bx-th bit in the first bit sequence is of a value of 1, and a bx-th bit in the third new ID is from the first new ID; a bx-th bit in the first bit sequence is of a value of 0, and a bx-th bit in the third new ID is from the fourth ID, where the bx-th bit is any bit in the first bit sequence.

In one embodiment, a first parameter is used as an input parameter to be input to an RE-digit register, and the third new ID is determined by an output of the RE-digit register, RE being a positive integer.

In one subembodiment, the first parameter comprises the first generation parameter.

In one subembodiment, the first parameter comprises the first time information.

In one subembodiment, the first parameter comprises a DFN determined by the first time information.

In one subembodiment, the first parameter comprises an SFN determined by the first time information.

In one subembodiment, the first parameter comprises at least part of bits in the first new ID.

In one subembodiment, the first parameter comprises at least part of bits in the fourth ID.

In one subembodiment, RE is equal to the length of the third new ID.

In one subembodiment, RE is equal to 23.
In one subembodiment, RE is equal to 24.
In one subembodiment, RE is equal to 25.

In one subembodiment, at least part of bits in the third new ID are equal to values output by the RE-digit register.

In one subembodiment, all bits in the third new ID are values output by the RE-digit register.

In one embodiment, the first generation parameter is a cyclic shift value.

In one subembodiment, the cyclic shift value is 0.
In one subembodiment, the cyclic shift value is an integer.

In one embodiment, the third new ID L2 is determined by the function as follows:

$$L2 = L1 \text{ XOR } C(L3, O1)$$

Herein, L2 is the third new ID, L1 is the first new ID, and L3 is the fourth ID, C( ) is cyclic shift function, O1 is a cyclic shift value determined by the first generation parameter, and XOR is Xor operation.

In one embodiment, C( ) is left cyclic shift function or right cyclic shift function.

In one embodiment, for a bit sequence [b1 b2 b3 b4 b5] which comprises 5 bits, when the cyclic shift value is 2, a processing result of the cyclic shift function C( ) is:

$$C([b1b2b3b4b5], 2) => [b3b4b5b1b2]$$

In one embodiment, the first ID set only comprises one of the first new ID and the fourth ID.

In one embodiment, the third new ID L2 is determined by the following relationship:

$$L2 = C(Lx, O2)$$

Herein, L2 is the third new ID, C( ) is cyclic shift function, O2 is a cyclic shift value determined by the first generation parameter.

In one subembodiment, Lx is the first new ID.
In one subembodiment, Lx is the fourth ID.

In one embodiment, the third new ID L2 is determined by the following relationship:

$$L2 = D(Lx)$$

Herein, D is a second function.

In one subembodiment, D is a decryption function.
In one subembodiment, the second function is configurable.
In one subembodiment, the second function is fixed.
In one subembodiment, Lx is the first new ID.
In one subembodiment, Lx is the fourth ID.

In one subembodiment, Lx is the fourth ID, the fourth ID being an ID applied before the third new ID is employed.

In one subembodiment, Lx is the fourth ID, and the fourth information or the fifth message indicates the fourth ID being updated as the third new ID.

In one subembodiment, the fourth information or the fifth message implicitly indicates the first ID set.

In one subembodiment, the fourth information indicates that the third new ID comes into effect.

In one subembodiment, the first node detects a MAC PDU carrying the third new ID.

In one subembodiment, the first node detects a MAC PDU carrying the fourth ID and a MAC PDU carrying the third new ID at the same time.

In one subembodiment, D is determined by the first node and the second node through negotiation.

In one subembodiment, D is determined by the second node.

In one embodiment, an advantage of the above method lies in that the third new ID being determined by a pre-update identity ensures that the identity update is rapid and easy to verify.

In one embodiment, the third new ID L2 is determined by the following relationship:

$$L2 = F1(Ly, R1)$$

Herein, F1 is fixed function, and R1 is determined by the first generation parameter.

In one subembodiment, F1 is XOR function.
In one subembodiment, R1 is a random bit sequence.
In one subembodiment, Ly is the first new ID.
In one subembodiment, Ly is the fourth ID.

In one subembodiment, Ly is the fourth ID, the fourth ID being an ID applied before the third new ID is employed.

In one subembodiment, Ly is the fourth ID, and the second node or a receiver of the first MAC PDU group indicates that the fourth ID is updated as the third new ID.

In one embodiment, the third new ID L2 is determined by the following relationship:

$$L2 = F2(Lz1, Lz2, R2)$$

Herein, F2 is fixed function, and R2 is determined by the first generation parameter.

In one subembodiment, F2 is slice function, used for slicing first R2 bit(s) in Lz1 to be concatenated with last (24-R2) bit(s) in Lz2, where R2 is a positive integer greater than 0 and less than 24.

In one subembodiment, F2 is XOR function.
In one subembodiment, R2 is a random bit sequence.
In one subembodiment, the first generation parameter indicates R2.
In one subembodiment, the first generation parameter indicates a seed for generating R2.
In one subembodiment, Lz1 is the first new ID.
In one subembodiment, Lz2 is the fourth ID.

In one subembodiment, one of Lz1 and Lz2 is the fourth ID, the fourth ID being an identity applied before employment of the third new ID.

In one subembodiment, one of Lz1 and Lz2 is the fourth ID, and the fourth information indicates that the fourth ID is updated as the third new ID.

In one subembodiment, F2 is Interleave function, used for interleaving Lz1 and Lz2 under the control of parameter R2.

In one subembodiment, R2 is the depth of interleaving.

In one subembodiment, R2 is a type indicator for interleaving.

In one embodiment, the first parameter set comprises first time information.

In one embodiment, the first time information comprises a System Frame Number (SFN).

In one embodiment, the first time information comprises a Direct Frame Number (DFN).

In one embodiment, the first time information comprises a DFN of a transmission time for the fourth information.

In one embodiment, the first time information comprises an SFN of a transmission time for the fifth message.

In one embodiment, the first time information comprises a DFN of a reception time for the fourth information.

In one embodiment, the first time information comprises an SFN of a reception time for the fifth message.

In one embodiment, the first time information comprises a DFN of a transmission time for the second MAC PDU.

In one embodiment, the first time information comprises an SFN of a transmission time for the second MAC PDU.

In one embodiment, the first time information comprises a DFN of a reception time for the second MAC PDU.

In one embodiment, the first time information comprises an SFN of a reception time for the second MAC PDU.

In one embodiment, the third new ID L2 is determined by the following relationship:

$$L2=F3(Lz3,Lz4,t1)$$

Herein, F3 is fixed function, and t1 is determined by the first generation parameter.

In one subembodiment, F3 is slice function, used for slicing first t1 bit(s) in Lz3 to be concatenated with last (24-t1) bit(s) in Lz4, where t1 is a value of DFN mod 24.

In one subembodiment, F3 is XOR function.

In one subembodiment, t1 is a random bit sequence.

In one subembodiment, Lz3 is the first new ID.

In one subembodiment, Lz4 is the fourth ID.

In one subembodiment, one of Lz3 and Lz4 is the fourth ID, the fourth ID being an identity applied before employment of the third new ID.

In one subembodiment, one of Lz3 and Lz4 is the fourth ID, and the fourth information indicates that the fourth ID is updated as the third new ID.

In one subembodiment, F3 is Interleave function, used for interleaving Lz3 and Lz4 under the control of parameter t1.

In one subembodiment, t1 is the depth of interleaving.

In one subembodiment, t1 is a type indicator for interleaving.

In one embodiment, an advantage of the above method lies in that the generation of third new ID depends on time, which ensures security; furthermore, the third new ID carried by a MAC PDU can vary with time, thus stronger security.

In one embodiment, the fourth information indicates a third new ID and a fourth ID.

In one embodiment, the first node monitors physical channels of the third new ID and the fourth ID simultaneously.

In one embodiment, the first node monitors MAC PDUs of the third new ID and the fourth ID simultaneously.

In one embodiment, the first node monitors MAC PDUs and SCI of the third new ID and the fourth ID simultaneously.

In one embodiment, when the MAC PDU carrying the third new ID is detected, the fourth ID will be invalid immediately and the third new ID becomes effective.

In one embodiment, when the third new ID is detected, the fourth ID will be invalid immediately and the third new ID becomes effective.

In one embodiment, the first parameter set comprises the first link ID.

In one embodiment, the first parameter set comprises the second link ID.

In one embodiment, the third new ID at least comprises part of bits in the first link ID.

In one embodiment, the third new ID at least comprises part of bits in the second link ID.

Embodiment 10

Embodiment 10 illustrates a schematic diagram of a processing device in a first node according to one embodiment of the present disclosure; as shown in FIG. 10. In FIG. 10, a processing device 1000 in a first node comprises a first receiver 1001 and a first transmitter 1002.

In Embodiment 10, the first receiver 1001 receives a second MAC PDU group, a MAC Header of any MAC PDU in the second MAC PDU group comprising at least part of bits in a first old ID; the second MAC PDU group comprising a first PDCP PDU, and a header of the first PDCP PDU comprising a first key ID; the first key ID being used to identify a first key, and the first key being used for generating a key used for a security algorithm applied to the first PDCP PDU;

the first transmitter 1002 transmits a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the first receiver 1001 receives a first message, the first message comprising the first new ID; an application of the first new ID is used to trigger a discontinuation of the first old ID.

As a response to receiving the first message, the first transmitter 1002 transmits a second message, the second message comprising a second new ID, and an application of the second new ID being used to trigger a discontinuation of a second old ID; the second new ID and the second old ID are link layer IDs, respectively.

The first receiver 1001 receives a third message, the third message being used to determine the second message; the first message, the second message and the third message are PC5-S messages;

herein, a MAC Header of any MAC PDU in the second MAC PDU group comprises at least part of bits in the second old ID.

In one embodiment, as a response to reception of the third message, and at least for transmission, the first old ID is updated as the first new ID;

the first receiver 1001 receives any new MAC PDU, the new MAC PDU being any MAC PDU of which the MAC Header comprises at least part of bits in the second new ID and at least part of bits in the first new ID; as a response to reception of any new MAC PDU, and at least for reception, the first old ID is updated as the first new ID;

In one embodiment, the first transmitter 1002 transmits a third MAC PDU group, the third MAC PDU group comprising a first RLC SDU group, the first RLC SDU group comprising a first old PDCP PDU, with a header of the first old PDCP PDU comprising the first key ID and not comprising the second key ID;

the action of transmitting the third MAC PDU group is performed after the reception of the third message, and the first old ID being updated as the first new ID is performed after the action of transmitting the third MAC PDU group.

In one embodiment, the first receiver 1001 receives fourth information, the fourth information being used to determine the third new ID; when the first old ID is updated as the first new ID, the third new ID is employed; when the second MAC PDU group is transmitted after employment of the third new ID, a header of any MAC PDU in the second MAC PDU group comprises at least part of bits in the third new ID and not the third old ID.

In one embodiment, the fourth information is a PC5-S message; as a response to reception of the fourth information, the first transmitter 1002 transmits a fifth message, the fifth message comprising a fourth ID;

when the first transmitter 1002 transmits the first MAC PDU group after employment of the third new ID, a header of any MAC PDU in the first MAC PDU group comprises at least part of bits in the fourth new ID.

In one embodiment, the fourth information is a higher layer signaling, and the fourth information comprises the third new ID; a transmitter of the fourth information and a transmitter of the first PDCP PDU are the same.

In one embodiment, the fourth information comprises a first parameter set, the first parameter set comprising the first new ID; the first parameter set is used for generating the third new ID.

In one embodiment, after the first old ID is updated as the first new ID, the first transmitter 1002 configures a field comprising the first key ID in a header of the first PDCP PDU as the second key ID.

In one embodiment, after the first old ID is updated as the first new ID, the first transmitter 1002 clears an RLC SDU comprising the first PDCP PDU;

the first receiver 1001 receives a third PDCP PDU, the third PDCP PDU comprising at least part of bits in the first PDCP PDU, with a header of the third PDCP PDU comprising the second key ID.

In one embodiment, after the first old ID is updated as the first new ID, the first transmitter 1002 re-establishes an RLC entity corresponding to an RLC SDU comprising the first PDCP PDU;

the first receiver 1001 receives a fourth PDCP PDU, the fourth PDCP PDU comprising at least part of bits in the first PDCP PDU; a header of the fourth PDCP PDU comprises the second key ID.

In one embodiment, after the first old ID is updated as the first new ID, when an RB used by the first PDCP PDU is an SRB, the first transmitter 1002 clears an RLC SDU comprising the first PDCP PDU, or, the first transmitter 1002 re-establishes an RLC entity corresponding to the RLC SDU comprising the first PDCP PDU; when an RB used by the first PDCP PDU is a DRB, the first transmitter 1002 configures the first key ID comprised by a header of the first PDCP PDU as the second key ID.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a ship.

In one embodiment, the first node is an IoT terminal.

In one embodiment, the first node is an IIoT terminal.

In one embodiment, the first node is a piece of equipment supporting low-delay and highly-reliable transmission.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Embodiment 11 illustrates a schematic diagram of a processing device in a second node according to one embodiment of the present disclosure; as shown in FIG. 11. In FIG. 11, a processing device 1100 in a second node comprises a second receiver 1102 and a second transmitter 1101.

In Embodiment 11, the second transmitter 1101 transmits a second MAC PDU group, a MAC Header of any MAC PDU in the second MAC PDU group comprising at least part of bits in a first old ID; the second MAC PDU group comprising a first PDCP PDU, and a header of the first PDCP PDU comprising a first key ID; the first key ID being used to identify a first key, and the first key being used for generating a key used for a security algorithm applied to the first PDCP PDU;

a receiver of the second MAC PDU group transmits a first MAC PDU group, the first MAC PDU group comprising a second PDCP PDU, the second PDCP PDU comprising at least part of bits in the first PDCP PDU; when the first old ID is not updated as a first new ID, a header of any MAC PDU in the first MAC PDU group comprises at least part of bits in a third old ID and a header of the second PDCP PDU comprises the first key ID; when the first old ID is updated as the first new ID, the header of any MAC PDU comprised in the first MAC PDU group comprises at least part of bits in a third new ID and the header of the second PDCP PDU comprises a second key ID;

herein, the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

In one embodiment, the second transmitter 1101 transmits a first message, the first message comprising the first new ID; an application of the first new ID is used to trigger a discontinuation of the first old ID;

The second receiver 1102 receives a second message, a second message, the second message comprising a second new ID, and an application of the second new ID being used to trigger a discontinuation of a second old ID; the second new ID and the second old ID are link layer IDs, respectively;

the second transmitter 1101 transmits a third message, the third message being used to determine the second message; the first message, the second message and the third message are PC5-S messages;

herein, a MAC Header of any MAC PDU in the second MAC PDU group comprises at least part of bits in the second old ID.

In one embodiment, as a response to reception of the third message by a receiver of the second MAC PDU group, and at least for transmission, the first old ID is updated as the first new ID;

the second transmitter 1101 transmits any new MAC PDU, the new MAC PDU being any MAC PDU of which the MAC Header comprises at least part of bits in the second new ID and at least part of bits in the first new ID; as a response to reception of any new MAC PDU by a receiver of the second MAC PDU group, and at least for reception, the first old ID is updated as the first new ID.

In one embodiment, a receiver of the second MAC PDU group receives fourth information, the fourth information being used to determine the third new ID; when the first old ID is updated as the first new ID, the third new ID is employed; when the second MAC PDU group is transmitted after employment of the third new ID, a header of any MAC PDU in the second MAC PDU group comprises at least part of bits in the third new ID and not the third old ID.

In one embodiment, the fourth information is a higher layer signaling, and the fourth information comprises the third new ID; a transmitter of the fourth information and a transmitter of the first PDCP PDU are the same.

In one embodiment, the fourth information comprises a first parameter set, the first parameter set comprising the first new ID; the first parameter set is used for generating the third new ID.

In one embodiment, after the first old ID is updated as the first new ID, a receiver of the second MAC PDU group configures a field comprising the first key ID in a header of the first PDCP PDU as the second key ID.

In one embodiment, after the first old ID is updated as the first new ID, a receiver of the second MAC PDU group clears an RLC SDU comprising the first PDCP PDU;

the second transmitter 1101 transmits a third PDCP PDU, the third PDCP PDU comprising at least part of bits in the first PDCP PDU, with a header of the third PDCP PDU comprising the second key ID.

In one embodiment, after the first old ID is updated as the first new ID, a receiver of the second MAC PDU group re-establishes an RLC entity corresponding to an RLC SDU comprising the first PDCP PDU;

the second transmitter 1101 transmits a fourth PDCP PDU, the fourth PDCP PDU comprising at least part of bits in the first PDCP PDU; a header of the fourth PDCP PDU comprises the second key ID.

In one embodiment, after the first old ID is updated as the first new ID, when an RB used by the first PDCP PDU is an SRB, a receiver of the second MAC PDU group clears an RLC SDU comprising the first PDCP PDU, or, a receiver of the second MAC PDU group re-establishes an RLC entity corresponding to the RLC SDU comprising the first PDCP PDU; when an RB used by the first PDCP PDU is a DRB, a receiver of the second MAC PDU group configures the first key ID comprised by a header of the first PDCP PDU as the second key ID.

In one embodiment, the second node is a UE.
In one embodiment, the second node is a terminal supporting large delay difference.
In one embodiment, the second node is a terminal supporting NTN.
In one embodiment, the second node is an aircraft.
In one embodiment, the second node is a vehicle-mounted terminal.
In one embodiment, the second node is a relay.
In one embodiment, the second node is a ship.
In one embodiment, the second node is an IoT terminal.
In one embodiment, the second node is an IIoT terminal.
In one embodiment, the second node is a piece of equipment supporting low-delay and highly-reliable transmission.
In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, NTN UE, etc. The base station or system device in the present disclosure includes but is not limited to macro-cellular base stations, micro-cellular base stations, home base stations, relay base station, gNB (NR node B), Transmitter Receiver Point (TRP), NTN base station, satellite equipment and flight platform and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a second MAC (Medium Access Control) PDU (Protocol Data Unit) group, with a MAC Header of any MAC PDU in the second MAC PDU group comprising information corresponding to a first portion of a first old identifier(ID); the second MAC PDU group comprises a first PDCP (Packet Data Convergence Protocol) PDU, and a header of the first PDCP PDU comprises a first key ID; the first key ID is used to identify a first key, and the first key is used for generating a key used for a security algorithm applied to the first PDCP PDU; and
a first transmitter, which transmits a first MAC PDU group, the first MAC PDU group comprising a second PDCP PDU, the second PDCP PDU comprising information corresponding to a first portion of the first PDCP PDU; when the first old ID is not updated as a first new ID, a header of any MAC PDU in the first MAC PDU group comprises part of bits in a third old ID and a header of the second PDCP PDU comprises the first key ID; when the first old ID is updated as the first new ID, the header of any MAC PDU comprised in the first MAC PDU group comprises information corresponding to a first portion of a third new ID and the header of the second PDCP PDU comprises a second key ID;
wherein the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs (identifiers) respectively, and the third new ID is different from the first new ID.

2. The first node according to claim 1, wherein:
the first receiver receives a first message, the first message comprising the first new ID; an application of the first new ID is used to trigger a discontinuation of the first old ID;
the first transmitter transmits a second message as a response to reception of the first message, the second message comprising a second new ID, and an application of the second new ID being used to trigger a discontinuation of a second old ID; the second new ID and the second old ID are link layer IDs, respectively;
the first receiver receives a third message, the third message being used to acknowledge the second message; the first message, the second message and the third message are PC5-S(PC5-S refers to a signaling on PC5 Interface) messages; and
a MAC Header of any MAC PDU in the second MAC PDU group comprises information corresponding to a first portion of the second old ID.

3. The first node according to claim 2, wherein:
as a response to reception of the third message, and at least for transmission, the first old ID is updated as the first new ID;
the first receiver receives any new MAC PDU, the new MAC PDU being any MAC PDU of which the MAC Header comprises information corresponding to a first portion of the second new ID and a first portion of the first new ID; and
as a response to reception of any new MAC PDU, and at least for reception, the first old ID is updated as the first new ID.

4. The first node according to claim 2, wherein:
the first transmitter transmits a third MAC PDU group, the third MAC PDU group comprising a first RLC (Radio Link Control) SDU (Service Data Unit) group, the first RLC SDU group comprising a first old PDCP PDU, with a header of the first old PDCP PDU comprising the first key ID and not comprising the second key ID;
the first transmitter transmitting the third MAC PDU group is performed after the first receiver receives the third message, and
the first old ID being updated as the first new ID is performed after the first transmitter transmits the third MAC PDU group.

5. The first node according to claim 1, wherein:
the first receiver, which receives fourth information, the fourth information being used to determine the third new ID;
when the first old ID is updated as the first new ID, the third new ID is employed; and
when the first transmitter transmits the second MAC PDU group after employment of the third new ID, a header of any MAC PDU in the second MAC PDU group comprises part of bits in the third new ID and not the third old ID.

6. The first node according to claim 5, characterized in that, wherein:
the fourth information is a PC5-S message;
as a response to reception of the fourth information, the first transmitter transmits a fifth message, the fifth message comprising a fourth ID; and
when the first transmitter transmits the second MAC PDU group after employment of the third new ID, a header of any MAC PDU in the second MAC PDU group comprises part of bits in the fourth ID.

7. The first node according to claim 5, characterized in that the fourth information is a higher layer signaling, and the fourth information comprises the third new ID; a transmitter of the fourth information and a transmitter of the first PDCP PDU are the same.

8. The first node according to claim 5, characterized in that the fourth information comprises a first parameter set, the first parameter set comprising the first new ID; the first receiver generates the third new ID according to the first parameter set.

9. The first node according to claim 2, wherein:
the first receiver receives fourth information, the fourth information being used to determine the third new ID;
when the first old ID is updated as the first new ID, the third new ID is employed; and
when the first transmitter transmits the second MAC PDU group after employment of the third new ID, a header of any MAC PDU in the second MAC PDU group comprises information corresponding to a first portion of the third new ID and not the third old ID.

10. The first node according to claim 9, characterized in that, wherein:
the fourth information is a PC5-S message;
as a response to reception of the fourth information, the first transmitter transmits a fifth message, the fifth message comprising a fourth ID; and
when the first transmitter transmits the second MAC PDU group after employment of the third new ID, a header of any MAC PDU in the second MAC PDU group comprises information corresponding to a first portion of the fourth ID.

11. The first node according to claim 9, characterized in that the fourth information is a higher layer signaling, and the fourth information comprises the third new ID; a transmitter of the fourth information and a transmitter of the first PDCP PDU are the same.

12. The first node according to claim 9, characterized in that the fourth information comprises a first parameter set, the first parameter set comprising the first new ID; the first receiver generates the third new ID according to the first parameter set.

13. The first node according to claim 1, characterized in that, wherein:
after the first old ID is updated as the first new ID, when an RB (Radio Bearer) used by the first PDCP PDU is an SRB (Signaling Radio Bearer), the first node clears an RLC SDU comprising the first PDCP PDU, or, the first node re-establishes an RLC entity corresponding to the RLC SDU comprising the first PDCP PDU; and
when an RB used by the first PDCP PDU is a DRB (Data Radio Bearer), the first node configures the first key ID comprised by a header of the first PDCP PDU as the second key ID.

14. The first node according to claim 1, characterized in that, wherein:
after the first old ID is updated as the first new ID, the first node re-establishes an RLC entity corresponding to an RLC SDU comprising the first PDCP PDU;
the first receiver receives a fourth PDCP PDU, the fourth PDCP PDU comprising information corresponding to a first portion of the first PDCP PDU; and
a header of the fourth PDCP PDU comprises the second key ID.

15. The first node according to claim 1, characterized in that, wherein:
after the first old ID is updated as the first new ID, the first node clears an RLC SDU comprising the first PDCP PDU;
the first receiver receives a third PDCP PDU, the third PDCP PDU comprising information corresponding to a first portion of the first PDCP PDU, with a header of the third PDCP PDU comprising the second key ID.

16. The first node according to claim 1, characterized in that after the first old ID is updated as the first new ID, the first node configures a field comprising the first key ID in a header of the first PDCP PDU as the second key ID.

17. The first node according to claim 2, characterized in that expiration of a second privacy timer of the first node is used to start a link ID update; after the first node receives the first message and before the third message is received, the first node maintains the second privacy timer; the action of maintaining the second privacy timer comprises resetting the second privacy timer as a response to transmission of the second message; or, the action of maintaining the second privacy timer comprises resetting the second privacy timer as a response to reception of the third message; or the action of maintaining the second privacy timer comprises suspending an update of the second privacy timer as a response to transmission of the second message.

18. A second node for wireless communications, comprising:
a second transmitter, which transmits a second MAC PDU group, with a MAC Header of any MAC PDU in the second MAC PDU group comprising information corresponding to a first portion of a first old identifier(ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU; and
a receiver of the second MAC PDU group, which transmits a first MAC PDU group, the first MAC PDU group comprising a second PDCP PDU, the second PDCP PDU comprising information corresponding to a first portion of the first PDCP PDU; when the first old ID is not updated as a first new ID, a header of any MAC PDU in the first MAC PDU group comprises information corresponding to a first portion of a third old ID and a header of the second PDCP PDU comprises the first key ID; when the first old ID is updated as the first new ID, the header of any MAC PDU comprised in the first MAC PDU group comprises information corresponding to a first portion of a third new ID and the header of the second PDCP PDU comprises a second key ID;
wherein the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

19. A method in a first node for wireless communications, comprising:
receiving a second MAC PDU group, with a MAC Header of any MAC PDU in the second MAC PDU group comprising information corresponding to a first portion of a first old identifier(ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU; and
transmitting a first MAC PDU group, the first MAC PDU group comprising a second PDCP PDU, the second PDCP PDU comprising information corresponding to a first portion of the first PDCP PDU; when the first old ID is not updated as a first new ID, a header of any MAC PDU in the first MAC PDU group comprises information corresponding to a first portion of a third old ID and a header of the second PDCP PDU comprises the first key ID; when the first old ID is updated as the first new ID, the header of any MAC PDU comprised in the first MAC PDU group comprises information corresponding to a first portion of a third new ID and the header of the second PDCP PDU comprises a second key ID;
wherein the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

20. A method in a second node for wireless communications, comprising:

transmitting a second MAC PDU group, with a MAC Header of any MAC PDU in the second MAC PDU group comprising information corresponding to a first portion of a first old identifier(ID); the second MAC PDU group comprises a first PDCP PDU, and a header of the first PDCP PDU comprises a first key ID; the first key ID is used to identify a first key, and the first key is used for generating a key used for a security algorithm applied to the first PDCP PDU; and a receiver of the second MAC PDU group transmitting a first MAC PDU group, the first MAC PDU group comprising a second PDCP PDU, the second PDCP PDU comprising information corresponding to a first portion of the first PDCP PDU; when the first old ID is not updated as a first new ID, a header of any MAC PDU in the first MAC PDU group comprises information corresponding to a first portion of bits in a third old ID and a header of the second PDCP PDU comprises the first key ID; when the first old ID is updated as the first new ID, the header of any MAC PDU comprised in the first MAC PDU group comprises information corresponding to a first portion of bits in a third new ID and the header of the second PDCP PDU comprises a second key ID;

wherein the first MAC PDU group comprises at least one MAC PDU, and the second MAC PDU group comprises at least one MAC PDU; the second key ID is used to identify the first key; the second key ID is different from the first key ID; a transmitter of the first PDCP PDU is different from a receiver of the second PDCP PDU, the first old ID, the first new ID, the third old ID and the third new ID are link layer IDs respectively, and the third new ID is different from the first new ID.

* * * * *